(12) United States Patent
Matsunaga et al.

(10) Patent No.: US 8,272,414 B2
(45) Date of Patent: *Sep. 25, 2012

(54) PNEUMATIC TIRE

(75) Inventors: Futoshi Matsunaga, Kanagawa (JP);
Kenichi Morita, Kanagawa (JP);
Hiromitsu Takei, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 556 days.

This patent is subject to a terminal disclaimer.

(21) Appl. No.: 12/513,655

(22) PCT Filed: Oct. 12, 2007

(86) PCT No.: PCT/JP2007/069980
§ 371 (c)(1),
(2), (4) Date: May 5, 2009

(87) PCT Pub. No.: WO2008/056508
PCT Pub. Date: May 15, 2008

(65) Prior Publication Data
US 2010/0065174 A1    Mar. 18, 2010

(30) Foreign Application Priority Data

Nov. 6, 2006  (JP) ................. 2006-300179
Dec. 15, 2006 (JP) ................. 2006-338959
May 30, 2007  (JP) ................. 2007-144067
Oct. 3, 2007  (JP) ................. 2007-260294

(51) Int. Cl.
*B60C 11/01*    (2006.01)

(52) U.S. Cl. .................... 152/209.14; 152/454
(58) Field of Classification Search ........... 152/209.1, 152/209.4, 209.16, 450, 454
See application file for complete search history.

(56) References Cited

U.S. PATENT DOCUMENTS

| 5,247,979 A | 9/1993 | Asano |
| 5,735,979 A | 4/1998 | Secondari |
| 5,803,998 A | 9/1998 | Ohsawa et al. |
| 2008/0105347 A1 | 5/2008 | Matsunaga et al. |

FOREIGN PATENT DOCUMENTS

| JP | A 61-229602 | 10/1986 |
| JP | A 64-60404  | 3/1989  |

(Continued)

OTHER PUBLICATIONS

JP 06-297913, Derwent Abstract, Oct. 25, 1994.*

*Primary Examiner* — Eric Hug
(74) *Attorney, Agent, or Firm* — Greer, Burns & Crain, Ltd.

(57) ABSTRACT

A tread surface includes a center arc, a shoulder-side arc, and a shoulder arc, and is formed such that a value given by F1=L1/(TDW×0.5) falls in the range of 0.64≦F1≦0.7, a value given by F2=TR1/OD falls in the range of 1.2≦F2≦2.0, a value given by F3=TR2/TR1 falls in the range of 0.1≦F3≦0.2, and a value given by F4=(β×TDW)/(100× SW) falls in the range of 0.35≦F4≦0.48, where L1 is outline range being a width from an equatorial plane to an edge of the center arc, TDW is extended tread width, TR1 is curvature radius of the center arc, TR2 is curvature radius of the shoulder-side arc, OD is tire outside diameter, SW is total width, and β is aspect ratio.

17 Claims, 22 Drawing Sheets

FOREIGN PATENT DOCUMENTS

| | | |
|---|---|---|
| JP | A 4-71908 | 3/1992 |
| JP | A 4-271902 | 9/1992 |
| JP | A 6-297913 | 10/1994 |
| JP | A 7-156604 | 6/1995 |
| JP | A 8-72510 | 3/1996 |
| JP | A 9-71107 | 3/1997 |
| JP | A 9-99714 | 4/1997 |
| JP | A 9-226312 | 9/1997 |
| JP | A 9-300906 | 11/1997 |
| JP | A 2001-260611 | 9/2001 |
| JP | A 2003-170702 | 6/2003 |
| JP | A 2004-50869 | 2/2004 |
| JP | A 2006-44470 | 2/2006 |
| JP | A 2007-15596 | 1/2007 |
| JP | A 2007-83913 | 4/2007 |
| JP | A 2007-160982 | 6/2007 |
| WO | WO 2006-134776 A1 | 12/2006 |
| WO | WO 2006/134776 A1 | 12/2006 |

* cited by examiner

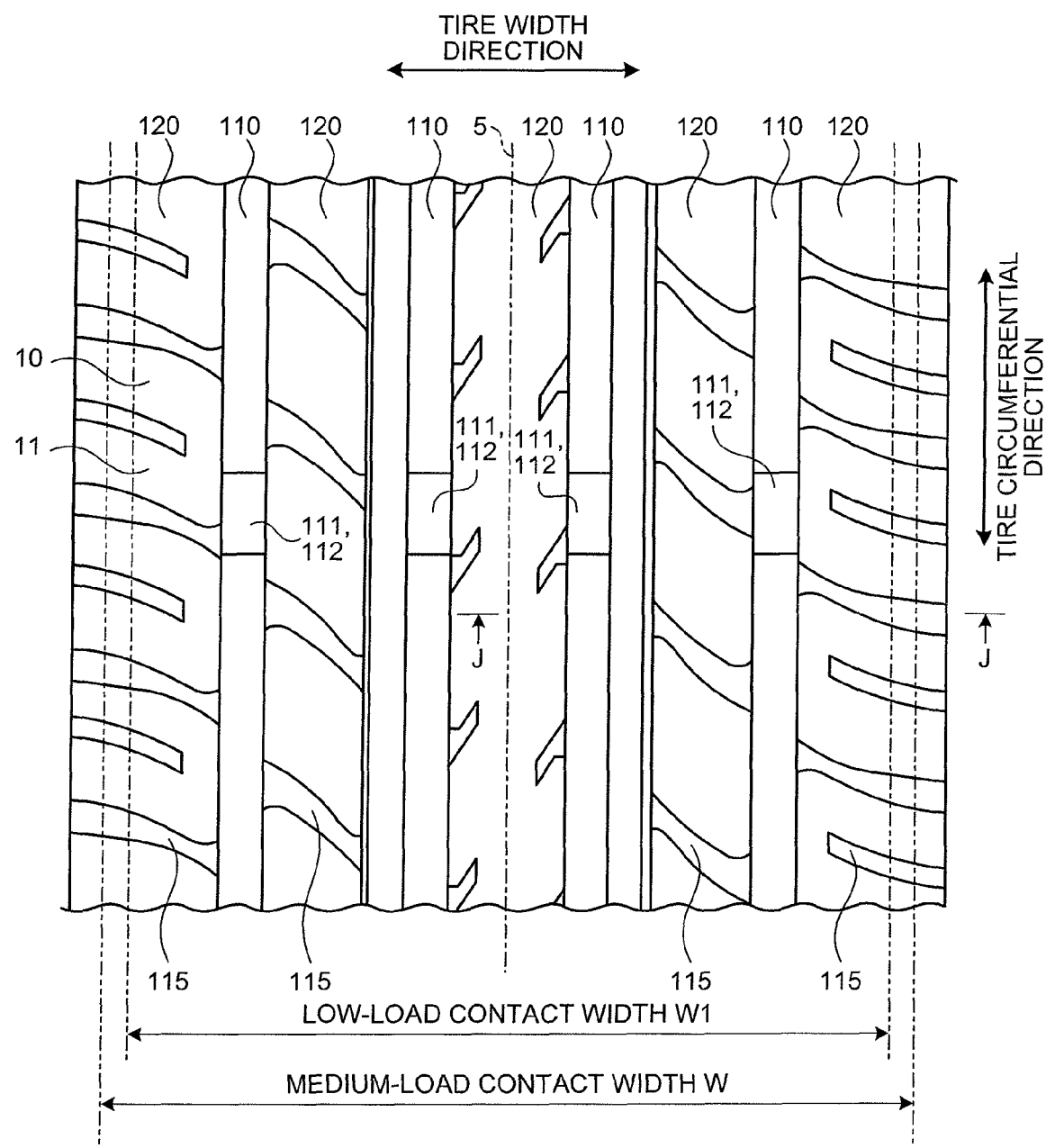

FIG.13

|  | COMPARATIVE EXAMPLE 1 | COMPARATIVE EXAMPLE 2 | PRESENT INVENTION 1 | PRESENT INVENTION 2 | PRESENT INVENTION 3 | PRESENT INVENTION 4 |
|---|---|---|---|---|---|---|
| $\beta$ | 45 | 45 | 45 | 45 | 45 | 45 |
| OD | 616 | 616 | 616 | 616 | 616 | 616 |
| TDW | 176 | 176 | 176 | 176 | 182 | 182 |
| L1 | 65 | 65 | 58 | 58 | 60 | 60 |
| SW | 214 | 214 | 214 | 214 | 220 | 220 |
| TR1 | 900 | 900 | 900 | 900 | 950 | 950 |
| TR2 | 200 | 200 | 150 | 150 | 120 | 120 |
| $\tan \delta$ | 0.28 | 0.16 | 0.28 | 0.16 | 0.28 | 0.16 |
| F1 | 0.74 | 0.74 | 0.66 | 0.66 | 0.66 | 0.66 |
| F2 | 1.46 | 1.46 | 1.46 | 1.46 | 1.54 | 1.54 |
| F3 | 0.22 | 0.22 | 0.17 | 0.17 | 0.13 | 0.13 |
| F4 | 0.37 | 0.37 | 0.37 | 0.37 | 0.37 | 0.37 |
| DOUBLE-LANE CHANGE TEST | ○ | ○ | ○ | ○ | ○ | ○ |
| WEAR RESISTANCE | 100 | 98 | 108 | 102 | 110 | 105 |
| BRAKING PERFORMANCE | 100 | 96 | 104 | 100 | 105 | 101 |

FIG. 14A

RUBBER A (GENERAL RUBBER)

| COMPOSITION | BLENDING QUANTITY | TRADE NAME | MANUFACTURER |
|---|---|---|---|
| SBR *1 | 137.5 | Nipol 1712 | ZEON CORPORATION |
| CARBON BLACK | 80 | SEAST KH | TOKAI CARBON CO., LTD. |
| SULFIDE | 3 | ZINC OXIDE 3 | SEIDO CHEMICAL INDUSTRY |
| STEARIC ACID | 1 | BEAD STEARIC ACID | NOF CORPORATION |
| ANTIOXIDANT | 2 | SANTOFLEX6PPD | FLEXSYS |
| WAX | 1 | SUNNOC | OUCHI SHINKO CHEMICAL INDUSTRIAL CO., LTD. |
| SULFUR | 2 | GOLDEN FLOWER OIL TREATED SULFUR POWDER | TSURUMI CHEMICAL INDUSTRY CO., LTD. |
| RUBBER ACCELERATOR 1 | 1 | NOCCELER CZ | OUCHI SHINKO CHEMICAL INDUSTRIAL CO., LTD. |

*1: CONTAINING 37.5 PERCENT BY WEIGHT OF OIL

FIG. 14B

RUBBER B (HPT RUBBER)

| COMPOSITION | BLENDING QUANTITY | TRADE NAME | MANUFACTURER |
|---|---|---|---|
| SBR *2 | 110 | Nipol 1721 | ZEON CORPORATION |
| BR | 20 | Nipol 1220 | ZEON CORPORATION |
| SILICA | 45 | Nipsil AQ | NIHON SILICA INDUSTRY |
| CARBON BLACK | 45 | SEAST 7HM | TOKAI CARBON CO., LTD. |
| SULFIDE | 3 | ZINC OXIDE 3 | SEIDO CHEMICAL INDUSTRY |
| STEARIC ACID | 1 | BEAD STEARIC ACID | NOF CORPORATION |
| ANTIOXIDANT | 2 | SANTOFLEX6PPD | FLEXSYS |
| WAX | 1 | SUNNOC | OUCHI SHINKO CHEMICAL INDUSTRIAL CO., LTD. |
| OIL | 7.5 | PROCESS X-140 | JAPAN ENERGY CORPORATION |
| SULFUR | 1.7 | GOLDEN FLOWER OIL TREATED SULFUR POWDER | TSURUMI CHEMICAL INDUSTRY CO., LTD. |
| RUBBER ACCELERATOR 1 | 2 | NOCCELER CZ | OUCHI SHINKO CHEMICAL INDUSTRIAL CO., LTD. |
| RUBBER ACCELERATOR 2 | 1 | SUNCELER D-G | SANSHIN KOUGYOU CO., LTD |

*2: CONTAINING 10 PERCENT BY WEIGHT OF OIL

FIG. 15A

|  | COMPARATIVE EXAMPLE 3 | COMPARATIVE EXAMPLE 4 | PRESENT INVENTION 5 | PRESENT INVENTION 6 | PRESENT INVENTION 7 |
|---|---|---|---|---|---|
| PROFILE | COMPARATIVE EXAMPLE 1 | COMPARATIVE EXAMPLE 1 | PRESENT INVENTION 1 | PRESENT INVENTION 1 | PRESENT INVENTION 1 |
| JIS A HARDNESS OF BASE RUBBER LAYER | 50 | 50 | 50 | 56 | 50 |
| BASE RUBBER LAYER/TREAD RUBBER CROSS SECTION RATIO (%) | 15 | 55 | 25 | 40 | 40 |
| TYPE OF CAP TREAD | RUBBER A | RUBBER A | RUBBER A | RUBBER A | RUBBER B |
| ROLLOVER RESISTANCE — DOUBLE-LANE CHANGE TEST | ○ | ○ | ◎ | ◎ | ○ |
| ROLLOVER RESISTANCE — TEST SPEED (km/h) | 60 | 60 | 62 | 62 | 60 |
| WEAR RESISTANCE | 100 | 100 | 110 | 108 | 105 |
| BRAKING PERFORMANCE | 100 | 98 | 105 | 104 | 108 |

FIG. 15B

|  | PRESENT INVENTION 8 | PRESENT INVENTION 9 | PRESENT INVENTION 10 | PRESENT INVENTION 11 | PRESENT INVENTION 12 |
|---|---|---|---|---|---|
| PROFILE | PRESENT INVENTION 1 | PRESENT INVENTION 1 | PRESENT INVENTION 1 | PRESENT INVENTION 1 | PRESENT INVENTION 1 |
| JIS A HARDNESS OF BASE RUBBER LAYER | 56 | 45 | 75 | 56 | 56 |
| BASE RUBBER LAYER/TREAD RUBBER CROSS SECTION RATIO (%) | 40 | 25 | 25 | 15 | 55 |
| TYPE OF CAP TREAD | RUBBER B | RUBBER A | RUBBER A | RUBBER A | RUBBER A |
| ROLLOVER RESISTANCE — DOUBLE-LANE CHANGE TEST | ○ | ◎ | ○ | ○ | ◎ |
| ROLLOVER RESISTANCE — TEST SPEED (km/h) | 60 | 62 | 60 | 60 | 62 |
| WEAR RESISTANCE | 104 | 109 | 108 | 108 | 106 |
| BRAKING PERFORMANCE | 108 | 102 | 106 | 105 | 101 |

FIG. 16A

|  | COMPARATIVE EXAMPLE 5 | COMPARATIVE EXAMPLE 6 | PRESENT INVENTION 13 | PRESENT INVENTION 14 | PRESENT INVENTION 15 |
|---|---|---|---|---|---|
| PROFILE | COMPARATIVE EXAMPLE 1 | COMPARATIVE EXAMPLE 1 | PRESENT INVENTION 1 | PRESENT INVENTION 1 | PRESENT INVENTION 1 |
| FILLER HEIGHT FH | 40 | 50 | 30 | 30 | 30 |
| JIS A HARDNESS Hs OF BEAD FILLER | 93 | 93 | 93 | 76 | 96 |
| G VALUE | 10.3 | 12.8 | 10.3 | 6.3 | 7.9 |
| ROLLOVER RESISTANCE — DOUBLE-LANE CHANGE TEST | ○ | ○ | ○ | ◎ | ◎ |
| ROLLOVER RESISTANCE — TEST SPEED (km/h) | 60 | 60 | 60 | 62 | 62 |
| WEAR RESISTANCE | 100 | 100 | 108 | 105 | 108 |
| BRAKING PERFORMANCE | 100 | 101 | 102 | 101 | 103 |

FIG. 16B

|  | PRESENT INVENTION 16 | PRESENT INVENTION 17 | PRESENT INVENTION 18 | PRESENT INVENTION 19 |
|---|---|---|---|---|
| PROFILE | PRESENT INVENTION 1 | PRESENT INVENTION 1 | PRESENT INVENTION 1 | PRESENT INVENTION 1 |
| FILLER HEIGHT FH | 40 | 50 | 45 | 26 |
| JIS A HARDNESS Hs OF BEAD FILLER | 76 | 93 | 93 | 76 |
| G VALUE | 8.4 | 12.8 | 11.5 | 5.4 |
| ROLLOVER RESISTANCE — DOUBLE-LANE CHANGE TEST | ◎ | ○ | ○ | ◎ |
| ROLLOVER RESISTANCE — TEST SPEED (km/h) | 62 | 60 | 60 | 62 |
| WEAR RESISTANCE | 106 | 108 | 108 | 105 |
| BRAKING PERFORMANCE | 101 | 103 | 102 | 100 |

FIG.17

| | PRESENT INVENTION 20 | PRESENT INVENTION 21 | PRESENT INVENTION 22 | PRESENT INVENTION 23 | PRESENT INVENTION 24 |
|---|---|---|---|---|---|
| PROFILE SHAPE | PROFILE RESISTANT TO ROLLOVER | TDWout×1.02 >TDWin | TDWin >TDWout×1.50 | TDWout×1.02 ≦TDWin | TDWin ≦TDWout×1.50 |
| TDWout | 88 | 88 | 88 | 88 | 88 |
| TDWin | 88 | 89 | 135 | 92 | 112 |
| TDW | 176 | 177 | 223 | 180 | 200 |
| TDWin/TDWout | 1.00 | 1.01 | 1.53 | 1.05 | 1.27 |
| β | 45 | 45 | 45 | 45 | 45 |
| OD | 616 | 616 | 616 | 616 | 616 |
| L1out | 58 | 58 | 58 | 58 | 58 |
| SW | 214 | 214 | 226 | 214 | 214 |
| TR1out | 900 | 900 | 900 | 900 | 900 |
| TR2out | 150 | 150 | 150 | 150 | 150 |
| F1out | 0.66 | 0.66 | 0.66 | 0.66 | 0.66 |
| F2out | 1.46 | 1.46 | 1.46 | 1.46 | 1.46 |
| F3out | 0.17 | 0.17 | 0.17 | 0.17 | 0.17 |
| F4out | 0.37 | 0.37 | 0.35 | 0.37 | 0.37 |
| DOUBLE-LANE CHANGE TEST | ○ | ○ | ○ | ○ | ○ |
| BRAKING PERFORMANCE | 100 | 101 | 101 | 105 | 110 |
| WEAR RESISTANCE | 100 | 101 | 101 | 107 | 115 |

FIG.18

|  | | COMPAR-ATIVE EXAMPLE 7 | PRESENT INVENTION 25 | PRESENT INVENTION 26 | PRESENT INVENTION 27 | PRESENT INVENTION 28 |
|---|---|---|---|---|---|---|
| TREAD PROFILE | | SYMMET-RICAL | SYMMET-RICAL | SYMMET-RICAL | ASYMMET-RICAL | ASYMMET-RICAL |
| SIDE PROFILE | | SYMMET-RICAL | SYMMET-RICAL | ASYMMET-RICAL | SYMMET-RICAL | ASYMMET-RICAL |
| $\beta$ | | 45 | 45 | 45 | 45 | 45 |
| OD | | 616 | 616 | 616 | 616 | 616 |
| TDW | | 176 | 176 | 176 | 182 | 182 |
| L1 | | 65 | 58 | 58 | 60 | 60 |
| SW | | 214 | 214 | 214 | 220 | 220 |
| TR1 | | 900 | 900 | 900 | 950 | 950 |
| TR2 | | 200 | 150 | 150 | 120 | 120 |
| F1 | | 0.74 | 0.66 | 0.66 | 0.66 | 0.66 |
| F2 | | 1.46 | 1.46 | 1.46 | 1.54 | 1.54 |
| F3 | | 0.22 | 0.17 | 0.17 | 0.13 | 0.13 |
| F4 | | 0.37 | 0.37 | 0.37 | 0.37 | 0.37 |
| S | | 0 | 0 | 5 | 0 | 5 |
| ROLLOVER RESISTANCE | DOUBLE-LANE CHANGE TEST | ○ | ○ | ◎ | ○ | ◎ |
| | TEST SPEED (km/h) | 60 | 60 | 62 | 60 | 62 |
| WEAR RESISTANCE | | 100 | 105 | 106 | 108 | 110 |
| BRAKING PERFORMANCE | | 100 | 102 | 103 | 105 | 106 |

FIG. 19A

|  |  | COMPARATIVE EXAMPLE 8 | PRESENT INVENTION 29 | PRESENT INVENTION 30 | PRESENT INVENTION 31 |
|---|---|---|---|---|---|
| TREAD PROFILE | | SYMMETRICAL | SYMMETRICAL | SYMMETRICAL | ASYMMETRICAL |
| SIDE PROFILE | | SYMMETRICAL | SYMMETRICAL | SYMMETRICAL | ASYMMETRICAL |
| $\beta$ | | 45 | 45 | 45 | 45 |
| OD | | 616 | 616 | 616 | 616 |
| TDW | | 176 | 176 | 176 | 182 |
| L1 | | 65 | 58 | 58 | 60 |
| SW | | 214 | 214 | 214 | 220 |
| TR1 | | 900 | 900 | 900 | 950 |
| TR2 | | 200 | 150 | 150 | 120 |
| F1 | | 0.74 | 0.66 | 0.66 | 0.66 |
| F2 | | 1.46 | 1.46 | 1.46 | 1.54 |
| F3 | | 0.22 | 0.17 | 0.17 | 0.13 |
| F4 | | 0.37 | 0.37 | 0.37 | 0.37 |
| JIS HARDNESS OF OUTER SIDE TREAD | | 53 | 44 | 44 | 44 |
| JIS HARDNESS OF INNER SIDE TREAD | | 53 | 59 | 59 | 59 |
| ROLLOVER RESISTANCE | DOUBLE-LANE CHANGE TEST | ○ | ◎ | ◎ | ◎ |
| | TEST SPEED (km/h) | 60 | 62 | 62 | 62 |
| WEAR RESISTANCE | | 100 | 105 | 106 | 108 |
| BRAKING PERFORMANCE | | 100 | 102 | 102 | 105 |
| HANDLING STABILITY | | 100 | 102 | 103 | 103 |

FIG. 19B

|  |  | PRESENT INVENTION 32 | PRESENT INVENTION 33 | PRESENT INVENTION 34 | PRESENT INVENTION 35 |
|---|---|---|---|---|---|
| TREAD PROFILE | | ASYMMETRICAL | ASYMMETRICAL | ASYMMETRICAL | ASYMMETRICAL |
| SIDE PROFILE | | ASYMMETRICAL | SYMMETRICAL | ASYMMETRICAL | ASYMMETRICAL |
| $\beta$ | | 45 | 45 | 45 | 45 |
| OD | | 616 | 616 | 616 | 616 |
| TDW | | 182 | 182 | 182 | 182 |
| L1 | | 60 | 60 | 60 | 60 |
| SW | | 220 | 220 | 220 | 220 |
| TR1 | | 950 | 950 | 950 | 950 |
| TR2 | | 120 | 120 | 120 | 120 |
| F1 | | 0.66 | 0.66 | 0.66 | 0.66 |
| F2 | | 1.54 | 1.54 | 1.54 | 1.54 |
| F3 | | 0.13 | 0.13 | 0.13 | 0.13 |
| F4 | | 0.37 | 0.37 | 0.37 | 0.37 |
| JIS HARDNESS OF OUTER SIDE TREAD | | 44 | 53 | 40 | 44 |
| JIS HARDNESS OF INNER SIDE TREAD | | 59 | 53 | 59 | 67 |
| ROLLOVER RESISTANCE | DOUBLE-LANE CHANGE TEST | ◎ | ○ | ◎ | ◎ |
| | TEST SPEED (km/h) | 62 | 60 | 62 | 62 |
| WEAR RESISTANCE | | 110 | 105 | 108 | 108 |
| BRAKING PERFORMANCE | | 106 | 102 | 103 | 103 |
| HANDLING STABILITY | | 105 | 101 | 95 | 96 |

FIG. 20A

|  |  | COMPARATIVE EXAMPLE 9 | COMPARATIVE EXAMPLE 10 | COMPARATIVE EXAMPLE 11 | PRESENT INVENTION 36 |
|---|---|---|---|---|---|
| LUG DEPTH | | D1 | 0.3D1 | 0.9D1 | 0.5D1 |
| HARDNESS OF CAP TREAD | | - | 70 | 70 | 70 |
| ANGLE OF BELT CORD | | 27 | 27 | 27 | 27 |
| ROLLOVER RESISTANCE | DOUBLE-LANE CHANGE TEST | ○ | ○ | ◎ | ◎ |
| | TEST SPEED (km/h) | 60 | 60 | 62 | 62 |
| HANDLING STABILITY | | 100 | 102 | 108 | 104 |
| HYDROPLANING | | 100 | 100 | 96.5 | 99 |

FIG. 20B

|  |  | PRESENT INVENTION 37 | PRESENT INVENTION 38 | PRESENT INVENTION 39 | PRESENT INVENTION 40 |
|---|---|---|---|---|---|
| LUG DEPTH | | 0.6D1 | 0.7D1 | 0.6D1 | 0.6D1 |
| HARDNESS OF CAP TREAD | | 70 | 70 | 60 | 80 |
| ANGLE OF BELT CORD | | 27 | 27 | 27 | 27 |
| ROLLOVER RESISTANCE | DOUBLE-LANE CHANGE TEST | ◎ | ◎ | ◎ | ◎ |
| | TEST SPEED (km/h) | 62 | 62 | 62 | 62 |
| HANDLING STABILITY | | 105 | 106 | 103 | 107 |
| HYDROPLANING | | 98.5 | 98 | 98.5 | 98.5 |

FIG. 20C

|  | PRESENT INVENTION 41 | PRESENT INVENTION 42 |
|---|---|---|
| LUG DEPTH | 0.6D1 | 0.6D1 |
| HARDNESS OF CAP TREAD | WITHIN LOW-LOAD CONTACT WIDTH: 70 OUTSIDE LOW-LOAD CONTACT WIDTH: 60 | WITHIN LOW-LOAD CONTACT WIDTH: 70 OUTSIDE LOW-LOAD CONTACT WIDTH: 60 |
| ANGLE OF BELT CORD | 27 | WITHIN LOW-LOAD CONTACT WIDTH: 27 OUTSIDE LOW-LOAD CONTACT WIDTH: 20 |
| ROLLOVER RESISTANCE — DOUBLE-LANE CHANGE TEST | ◎ | ◎ |
| ROLLOVER RESISTANCE — TEST SPEED (km/h) | 62 | 62 |
| HANDLING STABILITY | 109 | 112 |
| HYDROPLANING | 98.5 | 98.5 |

FIG. 20D

|  | PRESENT INVENTION 43 | PRESENT INVENTION 44 |
|---|---|---|
| LUG DEPTH | 0.6D1 | 0.6D1 |
| HARDNESS OF CAP TREAD | 58 | 80 |
| ANGLE OF BELT CORD | 27 | 27 |
| ROLLOVER RESISTANCE — DOUBLE-LANE CHANGE TEST | ◎ | ○ |
| ROLLOVER RESISTANCE — TEST SPEED (km/h) | 62 | 60 |
| HANDLING STABILITY | 100 | 108 |
| HYDROPLANING | 98.5 | 98.5 |

PNEUMATIC TIRE

This application is a U.S. National Phase under 35 U.S.C. §371 of International Application No. PCT/JP2007/069980, filed Oct. 12, 2007.

TECHNICAL FIELD

The present invention relates to a pneumatic tire. The invention particularly relates to a pneumatic tire including a tread surface whose cross section is formed of a plurality of arcs.

BACKGROUND ART

In pneumatic tires, different areas of a tread are generally used when traveling in a straight line and in a curved line. This may cause portions of the tread to be worn to different degrees depending on the travel conditions, resulting in biased wear. Some conventional pneumatic tires have a tread of an appropriate shape so as to reduce biased wear. In a pneumatic radial tire described in Patent Document 1 for example, aiming to make uniform distribution of contact pressure and contact length in the tread being in contact with the ground, the tread is formed to have a crown shape including three arcs of different curvature radii such that the curvature radii of the arcs and the lateral widths of the arcs all fall in appropriate ranges. This allows the tread to be worn uniformly along a crown width direction even when the vehicle travels under various conditions. Thus, the biased wear is reduced.

Patent Document 1: Japanese Patent Application Laid-open No. H9-71107

DISCLOSURE OF INVENTION

Problem to be Solved by the Invention

In conventional pneumatic tires, such biased wear is reduced by forming the pneumatic tires to have an appropriate crown shape as described above. Adjusting the crown shape changes driving features of the vehicle. For example, by adjusting the crown shape and controlling the ground contact areas around shoulders of the tread, it is possible to change the maximum cornering force when the vehicle with such pneumatic tires turns. The maximum cornering force contributes to handling stability and rollover resistance of the vehicle, which are contradicting features. In recent years, maintaining the rollover resistance is increasingly demanded due to the strong tendency to raise the vehicle's center of gravity and to achieve a pneumatic tire having a low aspect ratio.

One possible way to adjust the crown shape and maintain the rollover resistance is to reduce the maximum cornering force by making small ground contact areas around the shoulders. Making small ground contact areas around the shoulders, however, may extremely increase the contact pressure at these portions. This may easily cause wear around the shoulders. Further, making the small ground contact areas around the shoulders may reduce the braking performance due to the reduction in ground contact area. Thus, fulfilling all these conditions has been difficult.

The present invention is made in view of the foregoing, and an object of the present invention is to provide a pneumatic tire that achieves improved wear resistance and braking performance while maintaining the rollover resistance.

Means for Solving Problem

A pneumatic tire according to an aspect of the invention includes sidewalls on both tire-width-direction edges of the tire; and a tread that is located radially outward of the sidewalls, includes a cap tread, and has a surface serving as a tread surface formed of a plurality of arcs of different curvature radii, as seen in a meridional cross section thereof. Provided that the pneumatic tire is mounted on a normal rim and internal inflation pressure is 5% of normal internal pressure, and that the tread surface is formed of: a center arc located in a center portion in a tire width direction; a shoulder-side arc located at least on a vehicle-outer side in the tire width direction relative to the center arc; and a shoulder arc contouring a shoulder located on an edge of the tread surface, at least on the vehicle-outer side in the tire width direction, F1, given by Formula (1) below expressing a relation between an outline range L1 and an extended tread width TDW, falls in a range of $0.64 \leq F1 \leq 0.7$, F2, given by Formula (2) below expressing a ratio of a curvature radius TR1 of the center arc to a tire outside diameter OD, falls in a range of $1.2 \leq F2 \leq 2.0$, F3, given by Formula (3) below expressing a ratio of a curvature radius TR2 of the shoulder-side arc to the curvature radius TR1 of the center arc, falls in a range of $0.1 \leq F3 \leq 0.2$, and F4, given by Formula (4) below expressing a relation among an aspect ratio $\beta$, the extended tread width TDW, and a total width SW, falls in a range of $0.35 \leq F4 \leq 0.48$:

$$F1 = L1/(TDW \times 0.5) \qquad (1)$$

$$F2 = TR1/OD \qquad (2)$$

$$F3 = TR2/TR1 \qquad (3)$$

$$F4 = (\beta \times TDW)/(100 \times SW) \qquad (4)$$

where TR1 is the curvature radius of the center arc, TR2 is the curvature radius of the shoulder-side arc, L1 is the outline range of a width from an equatorial plane to a lateral edge of the center arc, TDW is the extended tread width being a lateral width of the tread surface, SW is the total width being a lateral width between laterally outermost portions of the sidewalls that are located on the both tire-width-direction edges and face each other, OD is the tire outside diameter being a largest diameter of the tread surface in a tire diameter direction, and $\beta$ is the aspect ratio.

According to the present invention, the relation F1 between the outline range L1 and the extended tread width TDW is calculated by the above formula, and arranged to fall in the range of $0.64 \leq F1 \leq 0.7$. Further, the ratio F2 of the curvature radius TR1 of the center arc to the tire outside diameter OD is arranged to fall in the range of $1.2 \leq F2 \leq 2.0$. This allows the tread surface to have a profile of a nearly flat shape. Accordingly, the ground contact area is increased under low load, for example, on rear tires of a front engine front drive (FF) vehicle, so that the maximum cornering force is increased under low load. This ensures the handling stability under low load. By increasing ground contact area under low load, the friction force between the tread surface and the road surface is improved, so that the braking performance is improved.

Further, the ratio F3 of the curvature radius TR2 of the shoulder-side arc to the curvature radius TR1 of the center arc is calculated by the above formula, and arranged to fall in the range of $0.1 \leq F3 \leq 0.2$. This provides an increased contact width under high load, for example, under the maximum load. Accordingly, the contact pressure is made uniform, so that the wear resistance is improved. By making uniform contact pressure, the friction force with the road surface is improved, so that the braking performance is improved. Further, the relation F4 among the aspect ratio $\beta$, the extended tread width TDW, and the total width SW is calculated by the above formula, and arranged to fall in the range of $0.35 \leq F4 \leq 0.48$. This provides a small extended tread width, thus reducing the ground contact area under high load. Accordingly, the maximum cornering force is reduced under high load, so that the rollover resistance is ensured under high load. As a result, the wear resistance and the braking performance are improved while the rollover resistance is maintained.

In the pneumatic tire according to the invention, a tangent line passing the lateral edge of the center arc and contacting the center arc and a tangent line passing a lateral outer edge of the shoulder arc and contacting the shoulder arc may form an angle $\alpha$ falling in a range of $35° \leq \alpha \leq 60°$.

According to the present invention, by arranging the angle $\alpha$ to fall in the range of $35° \leq \alpha \leq 60°$, the angular variation is made large around shoulders: from the tread surface toward the sidewalls. Thus, the shoulder wear of the shoulders is made at a steep angle. This prevents increase in the contact width under high load and at a steep slip angle, thus reducing the maximum cornering force under high load more reliably. As a result, the rollover resistance is improved more reliably.

In pneumatic tire according to the invention, F5, found by Formula (5) below giving a ratio of a curvature radius SHR of the shoulder arc to the curvature radius TR1 of the center arc, may fall in a range of $0.025 \leq F5 \leq 0.035$:

$$F5 = SHR/TR1 \qquad (5)$$

where SHR is the curvature radius of the shoulder arc.

According to the present invention, the ratio F5 of the curvature radius SHR of the shoulder arc to the curvature radius TR1 of the center arc is arranged to fall in the range of $0.025 \leq F5 \leq 0.035$. Accordingly, the curvature radius around the shoulders is made small. This prevents increase in the contact width under high load and at a steep slip angle, thus reducing the maximum cornering force under high load more reliably. As a result, the rollover resistance is improved more reliably.

In the pneumatic tire according to the invention, at least a portion of the cap tread may be made of a compound having 300% tensile modulus of 5 MPa to 10 MPa.

According to the present invention, the rollover resistance is largely affected by the compound of the cap tread included in the tread. Thus, by using a compound having 300% tensile modulus of 5 MPa to 10 MPa for at least a portion of the cap tread, the rollover resistance is improved. Specifically, by using such compound for at least a portion of the cap tread, the friction force in the tire width direction is reduced under high load and at a steep slip angle. As a result, the rollover resistance is improved more reliably.

In the pneumatic tire according to the invention, the tread may be formed of at least the cap tread, and tread rubber including a base rubber layer located radially inward of the cap tread, the base rubber layer may have Japanese industrial standard (JIS) A hardness of 48 to 60 at room temperature, and the base rubber layer may have a cross-sectional area in a range of 20% to 50% of a cross-sectional area of the tread rubber seen in a meridional cross section.

According to the present invention, the base rubber layer having low hardness is formed such that its cross sectional area is in the range of 20% to 50% of the cross sectional area of the tread rubber. Specifically, the base rubber layer is made thick in the tread rubber. This reduces the stiffness of the entire tread rubber, i.e., of the entire tread, reducing the maximum cornering force under high load. Thus, the rollover resistance is improved under high load. Because the stiffness of the entire tread is reduced and thus the maximum cornering force is reduced under high load, rubber having better grip performance can be used for the cap tread. This increases the maximum cornering force under low load, thus improving the handling stability and the braking performance under low load. As a result, the rollover resistance is improved, and the braking performance is improved more reliably.

In the pneumatic tire according to the invention, beads including bead cores may be provided radially inward of the sidewalls, and bead fillers may be provided radially outward of the bead cores, and G, given by Formula (6) below expressing a relation among the JIS A hardness Hs of the bead fillers, a filler height FH (millimeters), the tire outside diameter OD, and the aspect ratio $\beta$, may fall in a range of $6 \leq G \leq 11$:

$$G = (Hs \times FH)/(OD \times \beta) \qquad (6)$$

where Hs is JIS A hardness of the bead fillers, FH is the filler height that is a distance from an outer end, located on a radially outermost portion of one of the bead fillers seen in a meridional cross section, to a portion of the bead filler being farthest away from the outer end.

According to the present invention, the bead fillers are provided by calculating the relation G among JIS A hardness Hs of the bead fillers at room temperature, the filler height FH, the tire outside diameter OD, and the aspect ratio $\beta$, and arranging G to fall in the range of $6 \leq G \leq 11$. This provides appropriate stiffness in the bead fillers. Specifically, if G is less than 6, the hardness Hs of the bead fillers is too low or the filler height FH is too low. This may provide extremely low stiffness in the bead fillers, causing difficulty in ensuring the handling stability under low load. On the contrary, if G is greater than 11, the hardness Hs of the bead fillers is too high or the filler height FH is too high. This may provide extremely high stiffness in the bead fillers, causing difficulty in reducing the maximum cornering force under high load.

By providing the bead fillers such that the relation among the JIS A hardness Hs of the bead fillers at room temperature, the filler height FH, the tire outside diameter OD, and the aspect ratio $\beta$ falls in the range of $6 \leq G \leq 11$, appropriate stiffness is provided in the bead fillers. This ensures the handling stability under low load more reliably, reducing the maximum cornering force under high load. As a result, while the rollover resistance is maintained, the braking performance is improved, and further, the handling stability is ensured.

In the pneumatic tire according to the invention, the extended tread width TDW may include an outer extended tire width TDWout being a width of a portion of the tread surface on the vehicle-outer side in the tire width direction relative to the equatorial plane, and an inner extended tire width TDWin being a width of a portion of the tread surface on a vehicle-inner side in the tire width direction relative to the equatorial plane, in which: the outer extended tire width TDWout may be different from the inner extended tire width TDWin; the extended tread width TDW, the outer extended tire width TDWout, and the inner extended tire width TDWin may have a relation expressed by TDW=TDWout+TDWin; and the outer extended tire width TDWout and the inner extended tire width TDWin may have a relation expressed by (TDWout×1.02)≦TDWin≦(TDWout×1.50). The outline range L1 may be an outer outline range L1out included in the outline range, and located on the vehicle-outer side in the tire width direction relative to the equatorial plane. The curvature radius TR1 of the center arc may be a curvature radius TR1out of an outer center arc included in the center arc, and located on the vehicle-outer side in the tire width direction relative to the equatorial plane. The curvature radius TR2 of the shoulder-side arc may be a curvature radius TR2out of an outer shoulder-side arc included in the shoulder-side arc and located on the vehicle-outer side in the tire width direction relative to the equatorial plane. F1out, given by Formula (7) below expressing a relation between the outer outline range L1out and the outer extended tire width TDWout, may fall in a range of $0.64 \leq F1out \leq 0.7$, F2out, given by Formula (8) below expressing a ratio of the curvature radius TR1out of the outer center arc to the tire outside diameter OD, may fall in a range of $1.2 \leq F2out \leq 2.0$, F3out, given by Formula (9) below expressing a ratio of the curvature radius TR2out of the outer shoulder-side arc to the curvature radius TR1out of the outer center arc, may fall in a range of $0.1 \leq F3out \leq 0.2$, and F4out, given by Formula (10) below expressing a relation among the aspect ratio $\beta$, the outer extended tire width TDWout, and the total width SW, may fall in a range of $0.35 \leq F4out \leq 0.48$:

$$F1out = L1out/TDWout \quad (7)$$

$$F2out = TR1out/OD \quad (8)$$

$$F3out = TR2out/TR1out \quad (9)$$

$$F4out = (\beta \times TDWout \times 2)/(100 \times SW) \quad (10).$$

According to the present invention, different extended tread widths are provided on the vehicle-outer side and on the vehicle-inner side in the tire width direction. Further, as in F1, F2, F3, and F4 described above falling in the ranges of ($0.64 \leq F1 \leq 0.7$), ($1.2 \leq F2 \leq 2.0$), ($0.1 \leq F3 \leq 0.2$), and ($0.35 \leq F4 \leq 0.48$), respectively, F1out, F2out, F3out, and F4out fall in the ranges of ($0.64 \leq F1out \leq 0.7$), ($1.2 \leq F2out \leq 2.0$), ($0.1 \leq F3out \leq 0.2$), and ($0.35 \leq F4out \leq 0.48$), respectively.

With this arrangement, the shape of the tread surface is arranged such that only the tread surface located on the vehicle-outer side in the tire width direction relative to the equatorial plane has a profile resistant to rollover, which is the profile of the tread surface according to the above invention. Accordingly, in the tread surface on the vehicle-outer side in the tire width direction, which is a portion easily affected by a large load when the vehicle turns, the ground contact area is increased under low load while being reduced under high load. Thus, the wear resistance and the braking performance are improved while the rollover resistance is maintained.

According to the present invention, the tread surface on the vehicle-inner side in the tire width direction relative to the equatorial plane does not have a shape of the profile resistant to rollover. By forming the tread surface on the vehicle-inner side in the tire width direction relative to the equatorial plane to have a shape other than the profile resistant to rollover, the ground contact area is ensured under high load in the tread surface on the vehicle-inner side in the tire width direction. This improves the friction force between the road surface and the tread surface on the vehicle-inner side in the tire width direction during braking. Thus, the braking performance is further improved.

The relation between the outer extended tread width TDWout and the inner extended tread width TDWin falls in the range of (TDWout×1.02)≤TDWin≤(TDWout×1.50). This ensures the lateral width of the tread surface on the vehicle-inner side in the tire width direction relative to the equatorial plane, i.e., of the portion having a shape other than the profile resistant to rollover. Thus, when a large load acts on the tread surface, the ground contact area is increased on the vehicle-inner side in the tire width direction, while increase in the ground contact area is prevented on the vehicle-outer side in the tire width direction. As a result, the braking performance is further improved, when improving the wear resistance and the braking performance while maintaining the rollover resistance.

In the pneumatic tire according to the invention, provided that the laterally outermost portions of the sidewalls are tire maximum width positions, the sidewalls on the both tire-width-direction edges may be arranged such that SDHout is greater than SDHin, in which SDHout is a length of a perpendicular line extending from one of the tire maximum width positions on an outer sidewall to a rotation axis, and SDHin is a length of a perpendicular line extending from the other tire maximum width position on an inner sidewall to the rotation axis, the outer sidewall and the inner sidewall both being the sidewalls and respectively located on the vehicle-outer side and on the vehicle-inner side in the tire width direction relative to the equatorial plane.

According to the present invention, the length SDHout of the perpendicular line extending from the tire maximum width position on the outer sidewall to the rotation axis is made greater than the length SDHin of the perpendicular line extending from the tire maximum width position on the inner sidewall to the rotation axis. With this arrangement, the outer sidewall has less lateral stiffness than the inner sidewall. Accordingly, when the vehicle turns, a large load easily acts on a position on the vehicle-outer side in the tire width direction relative to the equatorial plane, in pneumatic tires located on the outer side in the turning radius direction. Thus, when the vehicle turns, a large load easily acts on the outer sidewall. By causing the outer sidewall to have low stiffness, however, the maximum cornering force is reduced under high load. This ensures the rollover resistance under high load.

Further, because the length SDHin of the perpendicular line extending from the tire maximum width position on the inner sidewall to the rotation axis is made less than the length SDHout of the perpendicular line extending from the tire maximum width position on the outer sidewall to the rotation axis, the vertical stiffness is ensured in the inner sidewall. This allows the inner sidewall to receive the load in the tire diameter direction during braking of the vehicle, thus lessening the contact pressure acting around the shoulders during braking of the vehicle. Thus, the braking performance is improved. As a result, the braking performance is improved while the rollover resistance is maintained.

In the pneumatic tire according to the invention, a difference S between SDHout and SDHin may fall in a range of 4 millimeters≤S≤25 millimeters, in which SDHout is the length of the perpendicular line extending from the tire maximum width position on the outer sidewall to the rotation axis, and SDHin is the length of the perpendicular line extending from the tire maximum width position on the inner sidewall to the rotation axis.

According to the present invention, the difference between the length SDHout of the perpendicular line extending from the tire maximum width position on the outer sidewall to the rotation axis and the length SDHin of the perpendicular line extending from the tire maximum width position on the inner sidewall to the rotation axis is arranged to fall in the range of 4 millimeters≤S≤25 millimeters. This improves the rollover resistance more reliably without reducing the handling stability. Specifically, if the difference S between SDHout and SDHin is less than 4 millimeters, the difference in stiffness between the outer sidewall and the inner sidewall is small. Thus, the rollover may be less improved.

On the contrary, if the difference S between SDHout and SDHin is greater than 25 millimeters, the difference in stiffness between the outer sidewall and the inner sidewall becomes extremely large. This may reduce the handling stability. Thus, by arranging the difference S between SDHout and SDHin to fall in the range of 4 millimeters≦S≦25 millimeters, the rollover resistance is improved more reliably without reducing the handling stability. As a result, the rollover resistance is improved more reliably while the handling stability is ensured.

In the pneumatic tire according to the invention, the sidewalls may include side treads formed of a rubber material and located in laterally outermost portions thereof, and the side treads of the sidewalls located on the both tire-width-direction edges may include an outer side tread and an inner side tread, and the outer side tread may have lower hardness than the inner side tread, the outer side tread and the inner side tread respectively included in the sidewalls located on the vehicle-outer side and on the vehicle-inner side in the tire width direction relative to the equatorial plane.

According to the present invention, because the outer side tread has lower hardness than the inner side tread, the stiffness is reduced in the sidewall located on the vehicle-outer side in the tire width direction relative to the equatorial plane. This reduces the maximum cornering force under high load, thus ensuring the rollover resistance under high load.

By arranging the outer side tread and the inner side tread to have hardness meeting the above relation, the stiffness is ensured in the sidewall located on the vehicle-inner side in the tire width direction relative to the equatorial plane. This allows the sidewall located on the vehicle-inner side in the tire width direction relative to the equatorial plane to receive the load in the tire diameter direction during braking of the vehicle. Accordingly, the contact pressure acting around the shoulders during braking of the vehicle is lessened, so that the braking performance is improved. As a result, the braking performance is improved while the rollover resistance is maintained.

In the pneumatic tire according to the invention, the outer side tread has may have JIS A hardness of 42 to 52, and the inner side tread may have JIS A hardness of 53 to 65.

According to the present invention, because the outer side tread has JIS A hardness of 42 to 52, the stiffness is reduced more reliably in the sidewall located on the vehicle-outer side in the tire width direction relative to the equatorial plane. This reduces the maximum cornering force under high load more reliably, thus ensuring the rollover resistance under high load. Further, because the inner side tread has JIS A hardness of 53 to 65, the stiffness is ensured more reliably in the sidewall located on the vehicle-inner side in the tire width direction relative to the equatorial plane. This lessens the contact pressure acting around the shoulders during braking more reliably, thus improving the braking performance during the braking of the vehicle. As a result, the braking performance is improved while the rollover resistance is maintained more reliably.

In the pneumatic tire according to the invention, the side treads of the sidewalls may be arranged such that a thickness of the outer side tread is less than a thickness of the inner side tread by 0.5 millimeter or more.

According to the present invention, because the thickness of the outer side tread is made less than the thickness of the inner side tread by 0.5 millimeter or more, the stiffness is reduced more reliably in the sidewall located on the vehicle-outer side in the tire width direction relative to the equatorial plane. Further, the stiffness is ensured in the sidewall located on the vehicle-inner side in the tire width direction relative to the equatorial plane. As a result, the braking performance is improved while the rollover resistance is maintained more reliably.

The pneumatic tire according to the invention may further includes beads including bead cores and provided radially inward of the sidewalls; and a carcass provided between the beads on both sides in the tire width direction, spanned from one of the beads to the other bead, and having folded sections where the carcass is folded back outwardly in the tire width direction along the bead cores. The folded sections on the both sides in the tire width direction may be arranged such that one of the folded sections located on the vehicle-outer side in the tire width direction relative to the equatorial plane has less height than the other folded section located on the vehicle-inner side in the tire width direction relative to the equatorial plane by 5 millimeters or more.

According to the present invention, the folded sections of the carcass have different heights, on the both sides in the tire width direction. Further, the height of the folded section located on the vehicle-outer side in the tire width direction relative to the equatorial plane is less than the height of the folded section located on the vehicle-inner side in the tire width direction relative to the equatorial plane by 5 millimeters or more. This provides lower stiffness in the sidewall located on the vehicle-outer side in the tire width direction relative to the equatorial plane than the sidewall located on the vehicle-inner side in the tire width direction relative to the equatorial plane. Accordingly, the load acting around the tread surface on the vehicle-outer side in the tire width direction is reduced, so that the maximum cornering force is reduced and the rollover resistance is ensured under high load. Further, the load in the tire diameter direction is received by the sidewall located on the vehicle-inner side in the tire width direction relative to the equatorial plane. This lessens the contact pressure acting around the shoulder during braking of the vehicle, thus improving the braking performance. As a result, the braking performance is improved while the rollover resistance is maintained.

In the pneumatic tire according to the invention, the tread surface may include a plurality of main grooves extending in a tire circumferential direction, and a plurality of lugs extending in the tire width direction. The main grooves may include main-groove bottom up sections having a small groove depth. The lugs may include lug bottom up sections having a small groove depth. The lug bottom up sections may be formed such that, at a portion within a low-load contact width, the groove depth of the lugs is 50% to 70% of an effective groove depth that is the groove depth of the main grooves including the main-groove bottom up sections, the low-load contact width being a lateral contact width of the tread surface under low load, at a portion outer than the low-load contact width in the tire width direction, an outer inclined section is formed whose groove bottom is inclined such that the groove depth of the lugs is increased outwardly in the tire width direction from a low-load contact width edge being a lateral edge of the low-load contact width.

According to the present invention, within the low-load contact width, the lugs are formed to have the lug bottom up sections such that the groove depth of the lugs is 50% to 70% of the effective groove depth. This improves the stiffness of the tread located within the low-load contact width, thus increasing the maximum cornering force under low load. Further, in the lug bottom up sections, at a portion located outer than the low-load contact width in the tire width direction, the outer inclined section is provided such that the groove depth of the lugs is increased outwardly in the tire width direction from the low-load contact width edge. This prevents that a contact patch of the tread under high load has increased stiffness than a contact patch under low load. Thus, increase in cornering force is prevented under high load. Further, because the outer inclined section is formed in the lugs, at a portion located outer than the low-load contact width in the tire width direction, water discharge is ensured through the lugs. As a result, the handling stability and the rollover resistance are improved without degrading the wet performance.

In the pneumatic tire according to the invention, provided that the main grooves include outermost main grooves located in laterally outermost portions, among the lugs, in each of the lug bottom up sections of the lugs connected to the outermost main grooves from inside in the tire width direction, an inner inclined section may be formed that has same lateral width as the outer inclined section, and that has a groove bottom giving a groove depth outwardly increased in the tire width direction.

According to the present invention, in each of the lug bottom up sections of the lugs connected to the outermost main grooves from inside in the tire width direction, the inner inclined section is formed. This ensures the water discharge through the lugs to the outermost main grooves, despite the lug bottom up sections provided. As a result, the handling stability and the rollover resistance are improved more reliably without degrading the wet performance.

In the pneumatic tire according to the invention, the cap tread may be made of a compound having JIS A hardness of 60 to 80, and 100% tensile modulus of 1.5 MPa to 4.5 MPa.

According to the present invention, a compound having JIS A hardness of 60 to 80 and 100% tensile modulus of 1.5 MPa to 4.5 MPa is used for the cap tread. This reduces the cornering force under high load more reliably, improving the handling stability. If the compound forming the cap tread has JIS A hardness greater than 80, the cornering force may not be reduced effectively under high load. On the contrary, if the compound forming the cap tread has JIS A hardness less than 60, the stiffness of the tread in the tire diameter direction and in tire width direction may become extremely low. This may degrade the response in neutral state, causing difficulty in improving the handling stability. Thus, by arranging the compound of the cap tread to fall in the above ranges, the cornering force is reduced under high load more reliably, and the handling stability is improved. As a result, the handling stability and the rollover resistance are improved more reliably without degrading the wet performance.

In the pneumatic tire according to the invention, the cap tread may have greater JIS A hardness at a portion within the low-load contact width than at a portion located outer than the low-load contact width in the tire width direction by 5 to 20.

According to the present invention, the JIS A hardness of the cap tread located within the low-load contact width is greater than the JIS A hardness of the cap tread located outer than the low-load contact width in the tire width direction. This provides high stiffness in the cap tread to be in contact with the ground under low load, thus providing lower stiffness in a contact patch under high load than a contact patch under low load. Accordingly, the maximum cornering force is reduced under high load while being increased under low load more reliably. As a result, the rollover resistance is improved more reliably.

The pneumatic tire may further include a plurality of belt layers including belt cords and located radially inward of the tread. In the belt layers, an angle formed by the belt cords located within the low-load contact width with respect to the tire circumferential direction may be smaller than an angle formed by the belt cords located outer than the low-load contact width in the tire width direction with respect to the tire circumferential direction by 3° to 10°.

According to the present invention, the angle of the belt cords of the belt layers located within the low-load contact width with respect to the tire circumferential direction is smaller than the angle of the belt cords of the belt layers located outer than the low-load contact width in the tire width direction with respect to the tire circumferential direction. This provides high stiffness in the cap tread to be in contact with the ground under low load, thus providing lower stiffness in a contact patch under high load than a contact patch under low load. Accordingly, the maximum cornering force is reduced under high load while being increased under low load more reliably. As a result, the rollover resistance is improved more reliably.

Effect of the Invention

A pneumatic tire according to the present invention provides an effect of improving wear resistance and braking performance while maintaining the rollover resistance.

BRIEF DESCRIPTION OF DRAWINGS

FIG. 8A is a detailed drawing of a C portion shown in FIG. 7.

FIG. 9 is a drawing for explaining a modification of the pneumatic tire according to the embodiment.

FIG. 13 is a table depicting results of performance evaluation tests conducted with a first test method.

FIG. 14A is a table depicting compositions of a rubber used for pneumatic tires on which performance evaluation tests were conducted with a second test method.

FIG. 14B is a table depicting compositions of a rubber used for pneumatic tires on which the performance evaluation tests were conducted with the second test method.

FIG. 15A is a table depicting results of performance evaluation tests conducted with the second test method.

FIG. 15B is a table depicting results of the performance evaluation tests conducted with the second test method.

FIG. 16A is a table depicting results of performance evaluation tests conducted with a third test method.

FIG. 16B is a table depicting results of the performance evaluation tests conducted with the third test method.

FIG. 17 is a table depicting results of performance evaluation tests conducted with a fourth test method.

FIG. 18 is a table depicting results of performance evaluation tests conducted with a fifth test method.

FIG. 19A is a table depicting results of performance evaluation tests conducted with a sixth test method.

FIG. 19B is a table depicting results of the performance evaluation tests conducted with the sixth test method.

FIG. 20A is a table depicting results of performance evaluation tests conducted with a seventh test method.

FIG. 20B is a table depicting results of the performance evaluation tests conducted with the seventh test method.

FIG. 20C is a table depicting results of the performance evaluation tests conducted with the seventh test method.

FIG. 20D is a table depicting results of the performance evaluation tests conducted with the seventh test method.

EXPLANATIONS OF LETTERS OR NUMERALS

Figure 1:
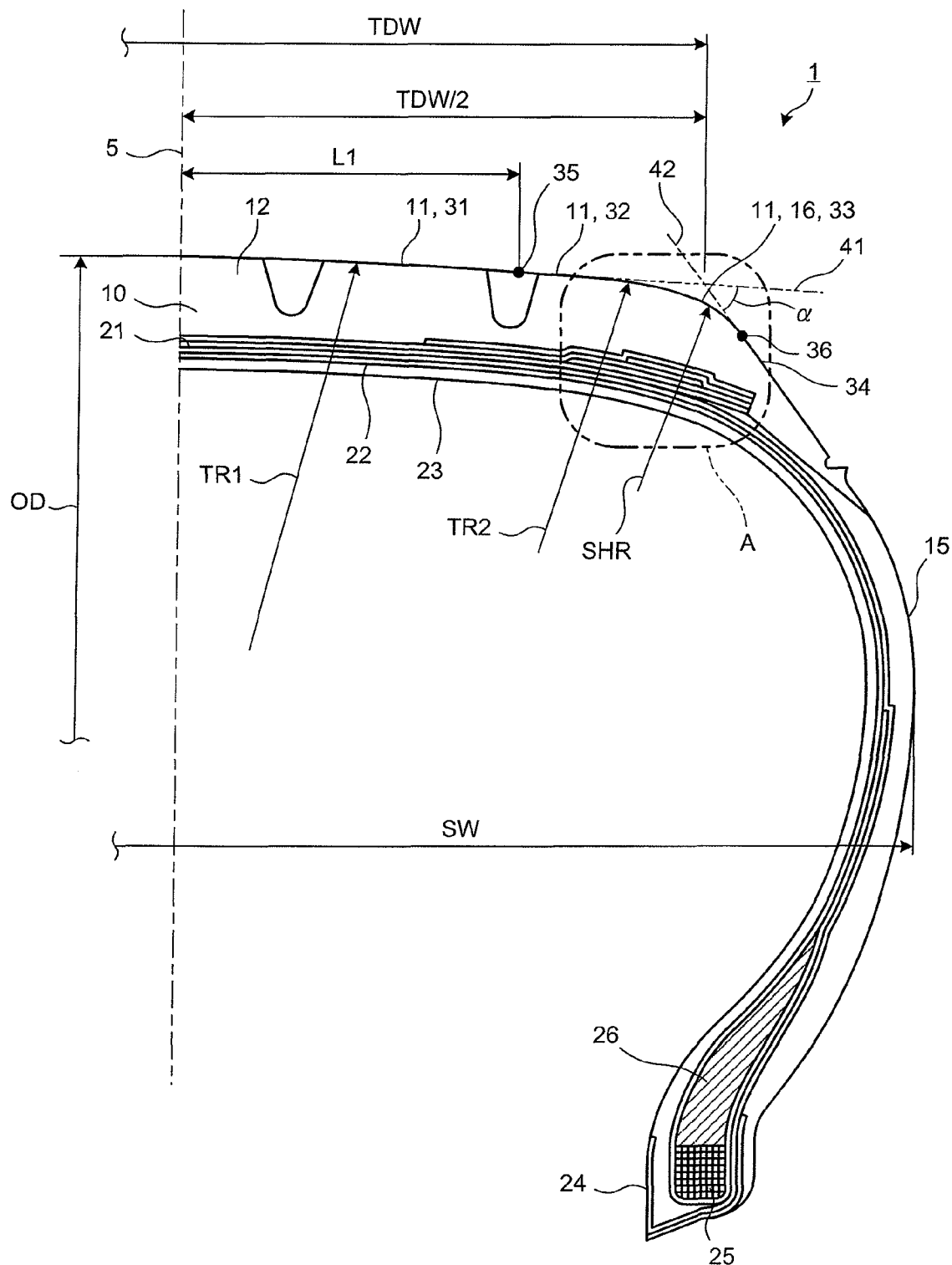
FIG. 1 is meridional cross section of relevant portions of a pneumatic tire according to the present invention.

1 pneumatic tire
5 equatorial plane
10 tread
11 tread surface
12 cap tread
15 sidewall
16 shoulder
21, 150 belt layer
22 carcass
23 inner liner
24 bead
25 bead core
26 bead filler
27 outer edge
28 inside-inner edge
29 inside-outer edge
31 center arc
32 shoulder-side arc
33 shoulder arc
34 side arc
35 center arc end
36 shoulder arc end
41 center arc tangent line
42 shoulder arc tangent line
45 shoulder-side arc extended line
46 side arc extended line
47 virtual tread edge
60 tread rubber
61 base rubber layer
62 wing chip
71 tire outer center arc
72 tire outer shoulder-side arc
80 rotation axis
81, 91 outer sidewall
82, 92 inner sidewall
85 tire maximum width position
95 side tread
96 outer side tread
97 inner side tread
100 turnup
101 outer turnup
102 inner turnup
110 main groove
111 main-groove bottom up section
112 wear indicator
113 outermost main groove
115 lug
116 lug bottom up section
117 outer inclined section
118 inner inclined section
155 belt cord

BEST MODE(S) FOR CARRYING OUT THE INVENTION

Exemplary embodiments of a pneumatic tire according to the present invention are described in detail with reference to the accompanying drawings. The present invention is not limited to the embodiments. Constituting elements in the embodiments include elements convertible by a person skilled in the art, or elements being substantially the same as those.

Embodiments

In the following description, a tire width direction is a direction parallel to a rotation axis of a pneumatic tire. An inner side in the tire width direction is a side being closer to a tire equatorial plane in the tire width direction, and an outer side in the tire width direction is an opposite side of the side being closer to the tire equatorial plane in the tire width direction. A tire diameter direction is a direction orthogonal to the rotation axis, and a tire circumferential direction is a direction in which the pneumatic tire rotates about the rotation axis serving as a center axis of its rotation. FIG. 1 is a meridional cross section of relevant portions of a pneumatic tire according to the present invention. A pneumatic tire 1 shown in FIG. 1 includes a tread 10 provided in a radially outermost portion of the tire, seen in a meridional cross section. On a lateral edge of the tread 10, i.e., from around a shoulder 16 up to a radially inner predetermined portion, is provided a sidewall 15. Specifically, sidewalls 15 are provided on both tire-width-direction edges of the pneumatic tire 1. On the inner side of the sidewalls 15 in the tire diameter direction are provided beads 24. The beads 24 are provided at two locations in the pneumatic tire 1, i.e., on opposite sides of an equatorial plane 5, so as to be symmetrical with respect to the equatorial plane 5. The beads 24 include bead cores 25, and bead fillers 26 are provided radially outward of the bead cores 25.

On the inner side of the tread 10 in the tire diameter direction is provided a plurality of belt layers 21. In a portion inner than the belt layers 21 in the tire diameter direction and closer to the equatorial plane 5 than the sidewalls 15 is continuously provided a carcass 22. The carcass 22 is folded back around the beads 24 outwardly in the tire width direction, along the bead cores 25. On the inner side of the carcass 22, or in a portion inner than the carcass 22 in the pneumatic tire 1 is formed an inner liner 23 along the carcass 22.

The tread 10 includes a cap tread 12. The cap tread 12 is located in a radially outer portion of the tread 10, and is exposed outside the pneumatic tire 1. Such an externally exposed portion of the cap tread 12, i.e., a surface of the cap tread 12, is formed as a tread surface 11. Further, the cap tread 12 is made of a compound having 300% tensile modulus of 5 MPa to 10 MPa.

Specifically, the compound of the cap tread 12 has a feature that its 300% tensile modulus according to JIS-K6251 is in the range of 5 MPa to 10 MPa.

Further, when 300% tensile force is applied in the tire width direction, the cap tread 12 has a modulus less than a modulus of 300% tensile force applied in the tire circumferential direction. Specifically, the cap tread 12 is made of an anisotropic rubber that has a smaller modulus when tensile force is applied in the tire circumferential direction than in the tire width direction. Such anisotropic rubber is used for the compound forming the cap tread 12.

In the tread 10 as seen in a meridional cross section of the pneumatic tire 1, the surface of the cap tread 12, or the tread surface 11 serving as a surface of the tread 10, is formed of a plurality of arcs having different curvature radii. Specifically, when the pneumatic tire 1 is mounted on a normal rim and internal inflation pressure is 5% of a normal internal pressure, the tread surface 11 is formed of a center arc 31, a shoulder-side arc 32, and a shoulder arc 33. The normal rim refers to a "normal rim" specified by the Japan automobile tyre manufacturers association, Inc. (JATMA), a "Design Rim" specified by the tire and rim association, Inc. (TRA), or a "Measuring Rim" specified by the European tyre and rim technical organization (ETRTO). The normal internal pressure refers to a "maximum air pressure" specified by JATMA, a maximum value of "TIRE LOAD LIMITS AT VARIOUS COLD INFLATION PRESSURES" specified by IRA, or an "INFLATION PRESSURES" specified by ETRTO. Note that the internal pressure is 180 kPa when the pneumatic tire 1 is attached to a passenger vehicle.

One of the arcs contouring the tread surface 11, i.e., the center arc 31, is located in a center portion of the tread surface 11 in the tire width direction. Containing the equatorial plane 5, the center arc 31 is formed on both sides of the equatorial plane 5 in the tire width direction. The center arc 31 has an arc shape outwardly bulged in the tire diameter direction, so as to have a largest diameter in the tire diameter direction around the equatorial plane 5.

The shoulder-side arc 32 is located outer than the center arc 31 on a vehicle-outer side in the tire width direction, or is located at two positions respectively on the both sides. The shoulder-side arc 32 bulges outwardly in the tire diameter direction. The shoulder arc 33 is located outer than the shoulder-side arc 32 in the tire width direction. The shoulder arc 33 is an arc contouring the shoulder 16, and bulging outwardly in the tire diameter direction.

Specifically, on the tread surface 11, the shoulder-side arc 32 is located either on the vehicle-outer side in the tire width direction, relative to the center arc 31 located in the center portion in the tire width direction, or at two positions respectively on the both sides. Further, the shoulder arc 33 is located either on the vehicle-outer side in the tire width direction relative to the shoulder-side arc 32, or on the both sides. The center arc 31, the shoulder-side arc 32, and the shoulder arc 33 are continuously formed and connected to each other. The center arc 31, the shoulder-side arc 32, and the shoulder arc 33 located in this manner respectively have a curvature radius TR1, a curvature radius TR2, and a curvature radius SHR, all different from one another.

Assuming that the pneumatic tire 1 is attached to a vehicle (not shown), the vehicle-outer side in the tire width direction refers to one of two tire-width-direction edges of the pneumatic tire 1, i.e., an edge located in a portion closer to the outer side of the vehicle in its width direction. On the other hand, in the pneumatic tire 1 attached to the vehicle, a vehicle-inner side in the tire width direction refers to one of the tire-width-direction edges of the pneumatic tire 1, i.e., an edge located in a portion closer to the inner side of the vehicle in its width direction or an edge located closer to the center of the vehicle in the width direction.

In a portion outer than the shoulder arc 33 in the tire width direction is provided a side arc 34. The side arc 34 is located outer than the shoulder arc 33 in the tire width direction. Further, the side arc 34 is connected to the shoulder arc 33, and formed from the shoulder arc 33 to the sidewall 15.

On the inner side of the tread 10 in the tire diameter direction, i.e., at two locations in the tire-width-direction edges of the pneumatic tire 1, are provided the sidewalls 15. The sidewalls 15 at two locations have contours that are both curved to bulge outwardly in the tire width direction, as seen in a meridional cross section. Because the sidewalls 15 at two locations are curved to bulge outwardly in the tire width direction, the total width of the pneumatic tire 1 is defined as a distance between most remote portions of the sidewalls 15 from the equatorial plane 5 in the tire width direction.

The tread surface 11 of the pneumatic tire 1 contoured in this manner is formed to have a predetermined shape. Specifically, portions of the pneumatic tire 1 are specified such that: L1 is an outline range of a lateral width between a center arc end 35 serving as a lateral edge of the center arc 31 and the equatorial plane 5; OD is the outside diameter of the pneumatic tire 1, i.e., the tire outside diameter serving as the largest diameter of the tread surface 11 in the tire diameter direction; and TDW is an extended tread width serving as the lateral width of the tread surface 11. Provided that the portions of the pneumatic tire 1 are specified as described above, the tread surface 11 is formed such that: a relation between the outline range L1 and the extended tread width TDW, given by Formula (11) below, falls in the range of $0.64 \leq F1 \leq 0.7$; and a ratio of the curvature radius TR1 of the center arc 31 to the tire outside diameter OD, given by Formula (12) below, falls in the range of $1.2 \leq F2 \leq 2.0$. Further, the tread surface 11 is formed such that a ratio of the curvature radius TR2 of the shoulder-side arc 32 to the curvature radius TR1 of the center arc 31, given by Formula (13) below, falls in the range of $0.1 \leq F3 \leq 0.2$:

$$F1 = L1/(TDW \times 0.5) \quad (11)$$

$$F2 = TR1/OD \quad (12)$$

$$F3 = TR2/TR1 \quad (13).$$

Figure 2:
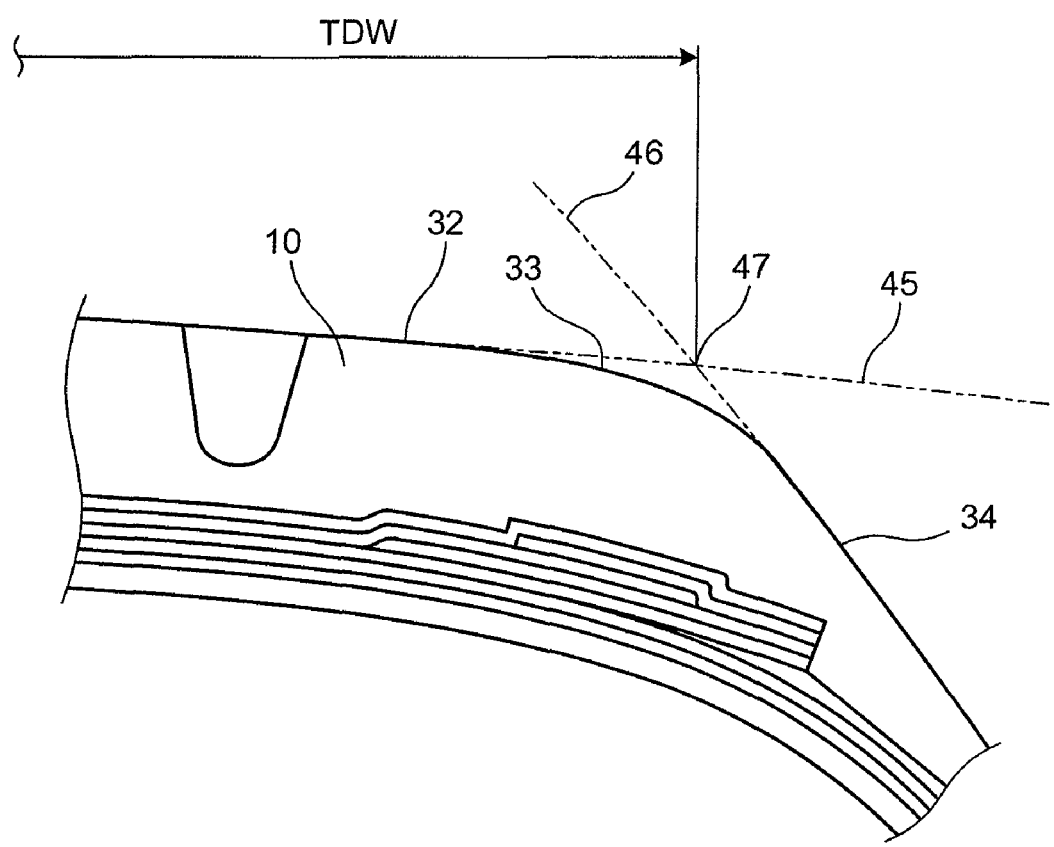
FIG. 2 is a detailed drawing of an A portion shown in FIG. 1.

FIG. 2 is a detailed drawing of an A part shown in FIG. 1. The extended tread width TDW is defined as a distance between virtual tread edges 47 located on both lateral edges of the tread 10. Specifically, when the pneumatic tire 1 is seen in a meridional cross section, each of the virtual tread edges 47 is defined as an intersection of: a shoulder-side arc extended line 45 that is a virtual line extended outwardly in the tire width direction from one shoulder-side arc 32, which is located on each side in the tire width direction; and a side arc extended line 46 that is a virtual line extended outwardly in the tire diameter direction from the side arc 34, which is connected to the shoulder arc 33 formed continuously from the shoulder-side arc 32. The virtual tread edges 47 are formed on the both sides in the tire width direction, and the lateral distance therebetween is defined as the extended tread width TDW.

Provided that $\beta$ is the aspect ratio of the pneumatic tire 1, and SW is the total width of the pneumatic tire 1 in the tire width direction, the pneumatic tire 1 is formed such that the relation among the aspect ratio $\beta$, the extended tread width TDW, and the total width SW, given by Formula (14) below, falls in the range of $0.35 \leq F4 \leq 0.48$:

$$F4 = (\beta \times TDW)/(100 \times SW) \quad (14).$$

Further, in the pneumatic tire 1, a plurality of angles is formed by: a center arc tangent line 41 that passes the center arc end 35 and serves as a tangent line to the center arc 31; and a shoulder arc tangent line 42 that passes a shoulder arc end 36 being a lateral outer edge of the shoulder arc 33 and serves as a tangent line to the shoulder arc 33. Among such angles, an angle $\alpha$, located on the inner side of the center arc tangent line 41 in the tire diameter direction and on the outer side of the shoulder arc tangent line 42 in the tire width direction, falls in the range of $35° \leq \alpha \leq 60°$.

In the pneumatic tire 1, the tread surface 11 is formed such that a ratio of the curvature radius SHR of the shoulder arc 33 to the curvature radius TR1 of the center arc 31, given by Formula (15) below, falls in the range of $0.025 \leq F5 \leq 0.035$:

$$F5 = SHR/TR1 \quad (15).$$

When a vehicle travels with such pneumatic tires 1, the pneumatic tires 1 rotate with a lower portion of each tread surface 11 making contact with the road surface (not shown). When the vehicle travels, because the tread surface 11 makes contact with the road surface, the load such as the vehicle's weight acts on the tread surface 11. Such load acting on the tread surface 11 varies depending on the travel conditions of the vehicle. When the vehicle travels at low speed and makes a turn, a relatively small load acts on the tread surface 11, whereas when the vehicle travels at high speed and makes a lane change or a turn, a relatively large load acts on the tread surface 11.

In this manner, when the vehicle travels, the tread surface 11 makes contact with the road surface with varying loads acting thereon. Because the tread surface 11 is deformed due to the load acting thereon, the maximum value of the cornering force, i.e., the maximum cornering force, in each condition changes depending on the deformation of the tread surface 11.

Specifically, when a small load acts on the tread surface 11, the tread surface 11 is not easily deformed. However, the tread surface 11 of the pneumatic tire 1 is arranged such that the relation F1 between the outline range L1 and the extended tread width TDW falls in the range of $0.64 \leq F1 \leq 0.7$, and that the ratio F2 of the curvature radius TR1 of the center arc 31 to the tire outside diameter OD falls in the range of $1.2 \leq F2 \leq 2.0$. This allows the tread surface 11 to have an almost flat shape under low load, for example, when the pneumatic tire 1 is used as a rear tire of an FF vehicle. Thus, the ground contact area is increased under low load.

Specifically, by making the ratio F2 of the curvature radius TR1 of the center arc 31 to the tire outside diameter OD equal to or greater than 1.2, the curvature radius TR1 of the center arc 31 is increased appropriately. On the other hand, by making F2 equal to or less than 2.0, it is possible to prevent that an extremely large difference occurs in curvature radius between the center arc 31 and the shoulder-side arc 32. This prevents that large stress acts around the center arc end 35.

By making the relation F1 between the outline range L1 and the extended tread width TDW equal to or greater than 0.64, the center arc 31 having a large curvature radius is formed in an increased range in the tire width direction. On the other hand, by making F1 equal to or less than 0.7, the shoulder-side arc 32 is formed in a secured range in the tire width direction. Thus, the curvature radius is made gradually smaller from the center arc 31 to the shoulder arc 33.

In this manner, by making the relation F1 between the outline range L1 and the extended tread width TDW fall in the range of $0.64 \leq F1 \leq 0.7$ and the ratio F2 of the curvature radius TR1 of the center arc 31 to the tire outside diameter OD fall in the range of $1.2 \leq F2 \leq 2.0$, the tread surface 11 has a shape of a nearly flat profile. This provides an increased ground contact area under low load, thus increasing the maximum cornering force under low load. Accordingly, the handling stability is ensured under low load. Particularly in an FF vehicle, because the vehicle rear body is light in weight, the rear tires are under low load. Thus, by increasing the maximum cornering force of the rear tires under low load, stability is improved in the rear tires, so that handling stability is improved in the FF vehicle. Further, by providing an increased ground contact area under low load, the friction force between the tread surface 11 and the road surface is improved, so that braking performance is improved.

On the other hand, when a large load acts on the tread surface 11, the tread surface 11 is easily deformed. However, because the pneumatic tire 1 is arranged such that the ratio F3 of the curvature radius TR2 of the shoulder-side arc 32 to the curvature radius TR1 of the center arc 31 falls in the range of $0.1 \leq F3 \leq 0.2$, the contact width is increased appropriately under high load.

Specifically, by making the ratio F3 of the curvature radius TR2 of the shoulder-side arc 32 to the curvature radius TR1 of the center arc 31 equal to or greater than 0.1, the shoulder-side arc 32 is prevented from having an extremely small curvature radius. This provides an appropriate contact width when the shoulder-side arc 32 of the tread surface 11 makes contact with the ground under high load. Thus, the contact width is increased appropriately under high load. On the contrary, by making the ratio F3 of the curvature radius TR2 of the shoulder-side arc 32 to the curvature radius TR1 of the center arc 31 equal to or less than 0.2, the shoulder-side arc 32 is prevented from having an extremely large curvature radius. This prevents the tread surface 11 from being extremely enlarged due to the contact between the shoulder-side arc 32 of the tread surface 11 and the ground under high load.

Thus, when a large load acts on the tread surface 11, for example, when the pneumatic tire 1 is under the maximum load, the contact width is increased appropriately. This makes uniform contact pressure, thus improving wear resistance. By making uniform contact pressure, the friction force with the road surface is improved, so that the braking performance is improved. The maximum load refers to a "maximum load capacity" specified by JATMA, a maximum value of "TIRE LOAD LIMITS AT VARIOUS COLD INFLATION PRESSURES" specified by TRA, or a "LOAD CAPACITY" specified by ETRTO.

When a large load acts on the tread surface 11, the tread surface 11 is easily deformed. However, because the pneumatic tire 1 is arranged such that the relation F4 among the aspect ratio β, the extended tread width TDW, and the total width SW falls in the range of $0.35 \leq F4 \leq 0.48$, the ground contact area is not increased much even under high load.

Specifically, by making the relation F4 among the aspect ratio β, the extended tread width TDW, and the total width SW equal to or greater than 0.35, the extended tread width TDW is ensured as minimally required relative to the total width SW. On the other hand, by making F4 equal to or less than 0.48, the extended tread width TDW is made small relative to the total width SW of the pneumatic tire 1. Thus, the increase in ground contact area is reduced when a large load acts on the tread surface 11, for example, when the pneumatic tire 1 is under the maximum load, so that the maximum cornering force is reduced under high load. Thus, rollover resistance is ensured under high load.

Specifically, the ratio F3 of the curvature radius TR2 of the shoulder-side arc 32 to the curvature radius TR1 of the center arc 31 is arranged to fall in the range of $0.1 \leq F3 \leq 0.2$. Further, the relation F4 among the aspect ratio β, the extended tread width TDW, and the total width SW is arranged to fall in the range of $0.35 \leq F4 \leq 0.48$. With this arrangement, the contact width is increased appropriately under high load and the ground contact area is made within an appropriate range, while the ground contact area is prevented from being extremely increased under high load. As a result, the wear resistance and the braking performance are improved while the rollover resistance is maintained.

Further, because the ratio F3 of the curvature radius TR2 of the shoulder-side arc 32 to the curvature radius TR1 of the center arc 31 falls in the range of $0.1 \leq F3 \leq 0.2$, the contact width is increased appropriately under high load. Thus, even when a rubber having low rolling performance is used for the rubber forming the tread surface 11, i.e., for the rubber forming the cap tread 12, the friction force is ensured between the tread surface 11 and the road surface. Specifically, even when a rubber having tan δ of a small value, for example, is used for the cap tread 12, the friction force is ensured between the tread surface 11 and the road surface. Thus, the braking performance is ensured regardless of the types of rubber used for the cap tread 12. As a result, the braking performance is improved more reliably. Further, because the braking performance is ensured regardless of the types of rubber used for the cap tread 12, more alternatives are available for selecting the material, and inexpensive rubber may be selected as well. As a result, manufacturing cost is reduced.

Because the angle α formed by the center arc tangent line 41 and the shoulder arc tangent line 42 falls in the range of 35°α60°, the rollover resistance is improved more reliably. Specifically, by making the angle α formed by the center arc tangent line 41 and the shoulder arc tangent line 42 equal to or larger than 35°, the angular variation is made large around the shoulder 16, from the tread surface 11 toward the sidewall 15. Thus, the shoulder wear of the shoulder 16 is made at a steep angle. On the other hand, by making the angle α formed by the center arc tangent line 41 and the shoulder arc tangent line 42 equal to or smaller than 60°, the stiffness is ensured around the shoulder arc 33. This prevents that more portions of the shoulder 16 make contact with the ground due to deformation of the shoulder 16 under high load and at a large slip angle, preventing increase in ground contact area due to the shoulder 16 being deformed and making contact with the ground. Thus, the maximum cornering force is reduced under high load more reliably, so that the rollover resistance is improved more reliably.

Because the ratio F5 of the curvature radius SHR of the shoulder arc 33 to the curvature radius TR1 of the center arc 31 falls in the range of $0.025 \leq F5 \leq 0.035$, the rollover resistance is improved more reliably. Specifically, by making the ratio F5 of the curvature radius SHR of the shoulder arc 33 to the curvature radius TR1 of the center arc 31 equal to or greater than 0.025, the stiffness is ensured around the shoulder arc 33. On the other hand, by making the ratio F5 of the curvature radius SHR of the shoulder arc 33 to the curvature radius TR1 of the center arc 31 equal to or less than 0.035, the shoulder wear of the shoulder 16 is made at a steep angle. This prevents that more portions of the shoulder 16 make contact with the ground due to deformation of the shoulder 16 under high load and at a large slip angle, preventing increase in ground contact area due to the deformation of the shoulder 16. Thus, the maximum cornering force is reduced under high load more reliably, so that the rollover resistance is improved more reliably.

Because the cap tread 12 is made of a compound having 300% tensile modulus of 5 MPa to 10 MPa, the friction force in the tire width direction is reduced under high load and at a steep slip angle, so that the rollover resistance is improved. As a result, the rollover resistance is improved more reliably.

As a compound forming the cap tread 12, an anisotropic rubber is used that has a smaller modulus when 300% tensile force is applied in the tire width direction than in the tire circumferential direction. This improves rollover resistance. Specifically, by using such anisotropic rubber as a compound forming the cap tread 12, the friction force in the tire width direction is reduced under high load and at a steep slip angle, so that the rollover resistance is improved. As a result, the rollover resistance is improved more reliably.

The compound of the cap tread 12, which has 300% tensile modulus of 5 MPa to 10 MPa, may be used for a portion of or the entire cap tread 12. Similarly, the anisotropic rubber, used as the compound forming the cap tread 12 and having a smaller modulus in the tire width direction than in the tire circumferential direction, may be used for a portion of or the entire cap tread 12. By using such compound and anisotropic rubber for at least a portion of the cap tread 12, the friction force in the tire width direction is reduced under high load and at a steep slip angle. Thus, the rollover resistance is improved more reliably.

Figure 3:
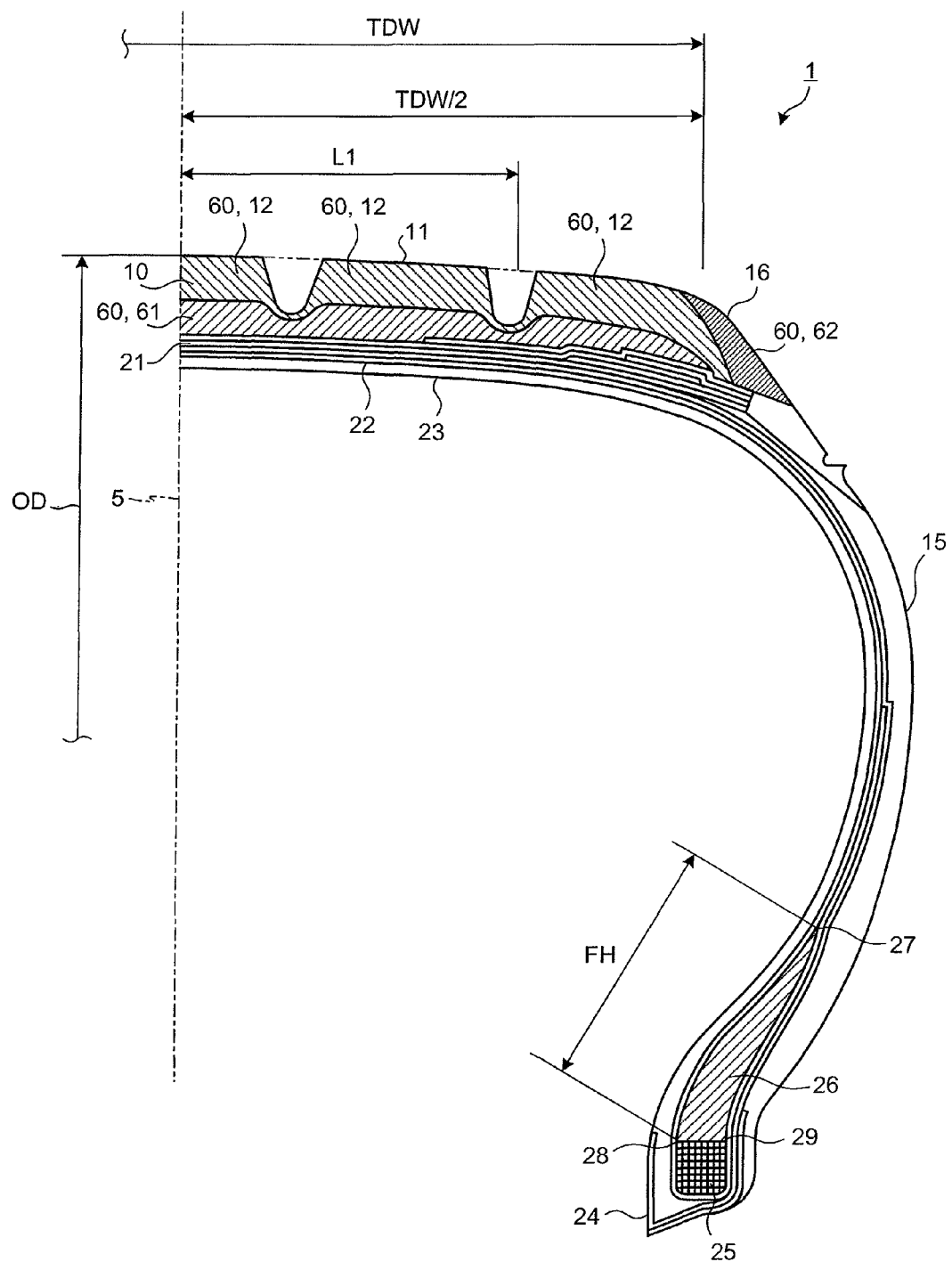
FIG. 3 is a drawing for explaining a tread and bead fillers of the pneumatic tire shown in FIG. 1.

FIG. 3 is a drawing for explaining the tread and the bead fillers of the pneumatic tire shown in FIG. 1. In many cases, the tread 10 is formed of the cap tread 12, and a tread rubber 60 including a base rubber layer 61 and wing chips 62 that are made of a rubber other than the rubber forming the cap tread 12. As to the tread 10 so formed, the ratio and the properties of the base rubber layer 61 in the tread rubber 60 are preferably specified in predetermined ranges. Specifically, as shown in FIG. 3, the tread 10 is generally formed of: the cap tread 12; and the tread rubber 60 including the base rubber layer 61 located radially inward of the cap tread 12, and the wing chips 62 located on both lateral edges of the cap tread 12. Among these, the base rubber layer 61 is preferably formed to have a cross sectional area being in the range of 20% to 50% of the cross sectional area of the tread rubber 60 seen in a meridional cross section. The base rubber layer 61 preferably has JIS A hardness (JIS K6253) of 48 to 60 at room temperature, specifically at 20° C.

The cap tread 12 has JIS A hardness (JIS K6253) of about 64 to 72 in many cases. By forming the base rubber layer 61 to have JIS A hardness of 48 to 60 at room temperature, the base rubber layer 61 has lower hardness than the cap tread 12 more reliably. Further, by forming the base rubber layer 61 to have a cross sectional area being in the range of 20% to 50% of the cross sectional area of the tread 60 seen in a meridional cross section, the maximum cornering force is reduced under high load more reliably, while being increased under low load.

Specifically, by arranging the base rubber layer 61 with low hardness to have a cross sectional area of not less than 20% of the cross sectional area of the tread rubber 60, a certain thickness is provided for the base rubber layer 61 made of the rubber with low hardness. This reduces the stiffness of the entire tread rubber 60, i.e., the stiffness of the entire tread 10. Accordingly, the maximum cornering force is reduced under high load, so that the rollover resistance is improved under high load. In this manner, by reducing the stiffness of the entire tread 10 and improving the rollover resistance under high load, grip performance is improved under low load. This allows use of the rubber with superior grip performance for the cap tread 12, thus increasing the maximum cornering force under low load. Accordingly, the handling stability and the braking performance are improved under low load.

On the other hand, by arranging the base rubber layer 61 with low hardness to have a cross sectional area of not more than 50% of the cross sectional area of the tread rubber 60, the base rubber layer 61 made of the rubber with low hardness is prevented from having an extremely large thickness. This prevents the entire tread 10 from having extremely low stiffness, preventing extremely low maximum cornering force under low load. Thus, the handling stability and the braking performance are ensured under low load. By forming the base rubber layer 61 as described, the maximum cornering force is reduced under high load more reliably, while being increased under low load. As a result, the rollover resistance is improved, and the braking performance is also improved more reliably.

The bead fillers 26 are preferably formed such that G given by Formula (16) below falls in the range of $6 \leq G \leq 11$. Provided that Hs is the JIS A hardness (JIS K6253) of the bead fillers 26 at room temperature, and that, in one bead filler 26 seen in a meridional cross section, FH (millimeters) is a filler height that is a distance from an outer edge 27 located on a radially outermost portion to an inside-inner edge 28 serving as an edge located radially inward of the bead filler 26 and also serving as an interior edge thereof in the tire width direction. Specifically, the filler height FH is a distance from the outer edge 27 of the bead filler 26 to the inside-inner edge 28 being furthest away from the outer edge 27 in the bead filler 26. In this case, the pneumatic tire 1 according to the present invention is formed such that G, given by Formula (16) below expressing a relation among the JIS A hardness Hs of the bead fillers 26 at room temperature, the filler height FH, the tire outside diameter OD, and the aspect ratio β, falls in the range of 6≦G≦11 preferably, or in the range of 7≦G≦9 more preferably:

$$G=(Hs \times FH)/(OD \times \beta) \quad (16).$$

By providing the bead fillers 26 such that G, calculated by Formula (16) above and expressing the relation among the JIS A hardness Hs of the bead fillers 26, the filler height FH, the tire outside diameter OD, and the aspect ratio β, falls in the range of 6≦G≦11, the bead fillers 26 have appropriate stiffness. Specifically, by forming the bead fillers 26 to have G greater than 6, the bead fillers 26 are prevented from having extremely low hardness Hs or an extremely small filler height FH. This ensures the stiffness of the bead fillers 26, thus ensuring the stiffness of the sidewalls 15. Accordingly, the maximum cornering force under low load is ensured more reliably.

On the other hand, by forming the bead fillers 26 to have G less than 11, the bead fillers 26 are prevented from having extremely high hardness Hs or an extremely large filler height FH. This prevents the bead fillers 26 from having extremely high stiffness, thus preventing the sidewalls 15 from having extremely high stiffness.

Accordingly, the maximum cornering force is reduced under high load more reliably. In this manner, by providing the bead fillers 26 such that the relation among the JIS A hardness Hs of the bead fillers 26, the filler height FH, the tire outside diameter OD, and the aspect ratio β falls in the range of 6≦G≦11, the bead fillers have appropriate stiffness. This ensures the handling stability under low load more reliably, reducing the maximum cornering force under high load. As a result, while the rollover resistance is maintained, the braking performance is improved, and further, the handling stability is ensured. On the other hand, by providing the bead fillers 26 such that the relation among the JIS A hardness Hs of the bead fillers 26 at room temperature, the filler height FH, the tire outside diameter OD, and the aspect ratio β falls in the range of 7≦G≦9, the rollover resistance, the braking performance, and the handling stability are further improved.

Although the filler height FH is defined as the distance from the outer edge 27 of one bead filler 26 to the inside-inner edge 28, the filler height FH may be a distance other than this. For example, the filler height FH may be a distance from the outer edge 27 of the bead filler 26 to an inside-outer edge 29 serving as an edge located radially inward of the bead filler 26 and also serving as an external edge thereof in the tire width direction. The filler height FH may be any distance as long as being a distance between portions of the bead filler 26 that give the largest width therebetween in a direction extending substantially along the sidewalls 15 or the carcass 22. Therefore, the filler height FH may be a distance other than the distance from the outer edge 27 of the bead filler 26 to the inside-inner edge 28.

Figure 4:
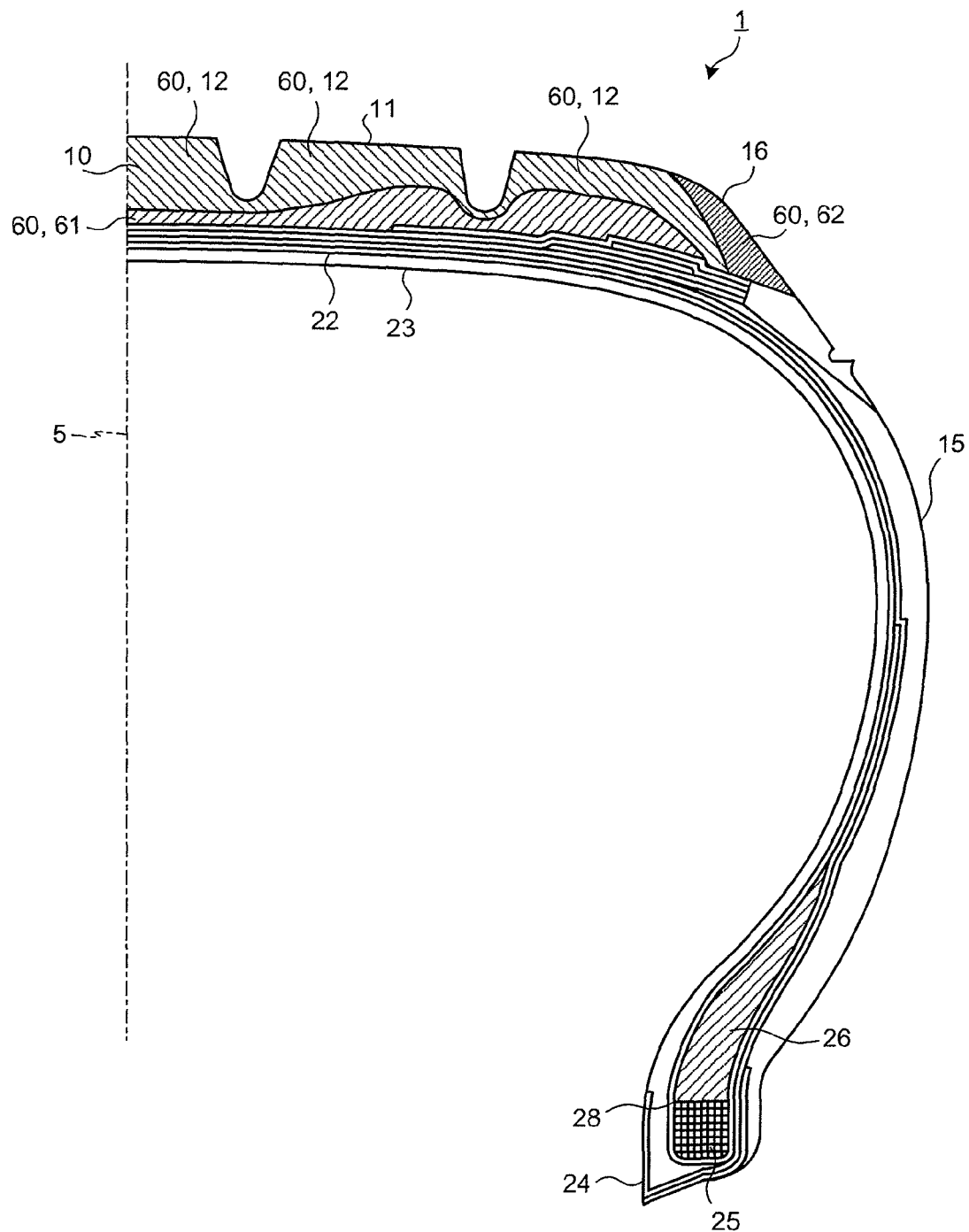
FIG. 4 is a drawing for explaining a modification of the pneumatic tire according to an embodiment.

FIG. 4 is a drawing for explaining a modification of the pneumatic tire according to the embodiment. The base rubber layer 61 may be formed to have any shape as long as its cross sectional area is in the range of 20% to 50% of the cross sectional area of the tread rubber 60 seen in a meridional cross section. For example, as shown in FIG. 3, the base rubber layer 61 may be formed substantially along the belt layers 21 and have a substantially uniform thickness in the tire diameter direction. Alternatively, as shown in FIG. 4, the base rubber layer 61 may be formed to have a larger thickness in the tire diameter direction around the shoulders 16 than around the equatorial plane 5. The base rubber layer 61 may be formed to have any shape, as long as its JIS A hardness is in the range of 48 to 60 at room temperature and its cross sectional area is in the range of 20% to 50% of the cross sectional area of the tread rubber 60 in the meridional cross section. By forming the base rubber layer 61 in this manner, the rollover resistance is improved, and the braking performance is also improved more reliably.

Figure 5:
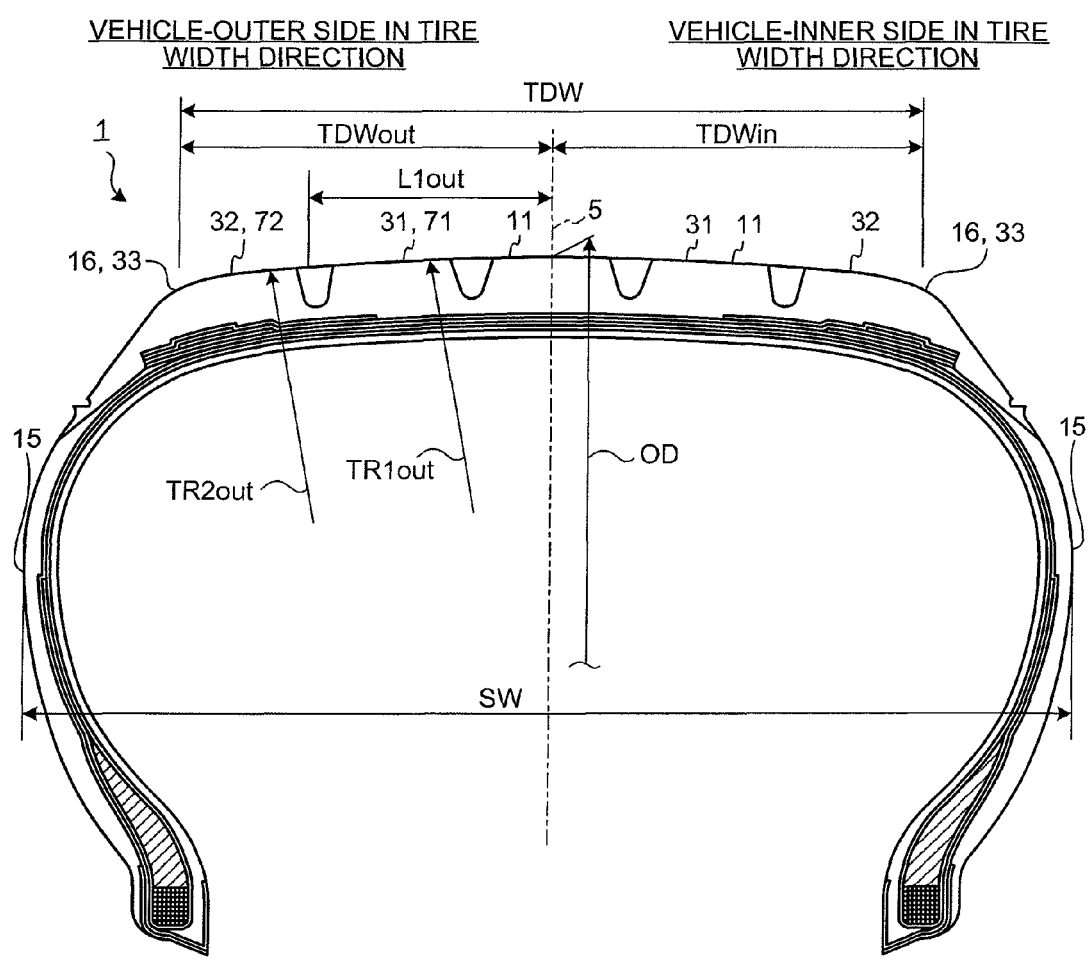
FIG. 5 is a drawing for explaining a modification of the pneumatic tire according to the embodiment.

FIG. 5 is a drawing for explaining a modification of the pneumatic tire according to the embodiment. In the tread surface 11 according to the present invention, the arc shape at cross section need not be provided on the both sides in the tire width direction as described above. The arc shape at cross section may be provided on either one side with respect to the equatorial plane 5 in the tire width direction. Specifically, the tread surface 11 located on the both sides in the tire width direction need not be formed to have a profile resistant to rollover, which is descried above as the profile of the tread surface 11, and only either one side of the tread surface 11 with respect to the equatorial plane 5 in the tire width direction may be formed to have a profile resistant to rollover. For example, only the tread surface 11 located on the vehicle-outer side in the tire width direction relative to the equatorial plane 5 may be formed to have a profile resistant to rollover.

Specifically, different extended tread widths are provided on the vehicle-outer side and on the vehicle-inner side in the tire width direction, so that the tread surface 11 located on the vehicle-outer side in the tire width direction relative to the equatorial plane 5 has a width, an outer extended tire width TDWout, while the tread surface 11 located on the vehicle-inner side in the tire width direction relative to the equatorial plane 5 has another width, an inner extended tire width TDWin. The relation among the tread extended width TDW, the outer extended tire width TDWout, and the inner extended tire width TDWin is given by TDW=TDWout+TDWin. Further, by arranging the outer extended tire width TDWout so provided to be greater than the inner extended tire width TDWin, the relation between the outer extended tire width TDWout and the inner extended tire width TDWin falls in the range of (TDWout×1.02)≦TDWin≦(TDWout×1.50).

In this case, the outline range L1 is an outer outline range L1out located on the vehicle-outer side in the tire width direction relative to the equatorial plane 5. The curvature radius TR1 of the center arc 31 is a curvature radius TR1out of a tire outer center arc 71 that is the center arc 31 located on the vehicle-outer side in the tire width direction relative to the equatorial plane 5. Further, the curvature radius TR2 of the shoulder-side arc 32 is a curvature radius TR2out of a tire outer shoulder-side arc 72 that is the shoulder-side arc 32 located on the vehicle-outer side in the tire width direction relative to the equatorial plane 5. As such, the tread surface 11 located on the vehicle-outer side in the tire width direction relative to the equatorial plane 5 has a profile resistant to rollover. Thus, the correlation among the outer outline range L1out, the curvature radius TR1out of the tire outer center arc 71, the curvature radius TR2out of the tire outer shoulder-side arc 72, and the like is found in the relations described above.

Specifically, F1out given by Formula (17) below expressing a relation between the outer outline range L1out and the outer extended tire width TDWout falls in the range of $0.64 \leq F1out \leq 0.7$. F2out given by Formula (18) below for finding a ratio of the curvature radius TR1out of the tire outer center arc 71 to the tire outside diameter OD falls in the range of $1.2 \leq F2out \leq 2.0$. F3out given by Formula (19) below for finding a ratio of the curvature radius TR2out of the tire outer shoulder-side arc 72 to the curvature radius TR1out of the tire outer center arc 71 falls in the range of $0.1 \leq F3out \leq 0.2$. Further, F4out given by Formula (20) below expressing a relation among the aspect ratio $\beta$, the outer extended tire width TDWout, and the total width SW falls in the range of $0.35 \leq F4out \leq 0.48$:

$$F1out = L1out/TDWout \tag{17}$$

$$F2out = TR1out/OD \tag{18}$$

$$F3out = TR2out/TR1out \tag{19}$$

$$F4out = (\beta \times TDWout \times 2)/(100 \times SW) \tag{20}$$

Specifically, in a similar manner that different extended tread widths are provided on the vehicle-outer side and on the vehicle-inner side in the tire width direction and that F1, F2, F3, and F4 above fall in the ranges of $(0.64 \leq F1 \leq 0.7)$, $(1.2 \leq F2 \leq 2.0)$, $(0.1 \leq F3 \leq 0.2)$, and $(0.35 \leq F4 \leq 0.48)$, respectively, F1out, F2out, F3out, and F4out fall in the ranges of $(0.64 \leq F1out \leq 0.7)$, $(1.2 \leq F2out \leq 2.0)$, $(0.1 \leq F3out \leq 0.2)$, and $(0.35 \leq F4out \leq 0.48)$, respectively.

With this arrangement, the shape of the tread surface 11 is arranged such that only the tread surface 11 located on the vehicle-outer side in the tire width direction relative to the equatorial plane 5 has a profile resistant to rollover. Accordingly, the ground contact area is increased in the tread surface 11 located on the vehicle-outer side in the tire width direction under low load, so that the handling stability and the braking performance are improved under low load. On the contrary, the ground contact area is reduced in the tread surface 11 on the vehicle-outer side in the tire width direction under high load, so that the ground contact area is reduced under high load at portions easily affected by a large load when the vehicle turns. This ensures rollover resistance under high load. Thus, the wear resistance and the braking performance are improved while the rollover resistance is maintained.

In this modification, the shape of the tread surface 11 on the vehicle-inner side in the tire width direction relative to the equatorial plane 5 is not a profile resistant to rollover. However, by forming the tread surface 11 on the vehicle-inner side in the tire width direction relative to the equatorial plane 5 to have a shape other than a profile resistant to rollover, a ground contact area is ensured in the tread surface 11 on the vehicle-inner side in the tire width direction under high load. This improves the friction force between the road surface and the tread surface 11 on the vehicle-inner side in the tire width direction during braking. Thus, the braking performance is further improved.

The relation between the outer extended tire width TDWout and the inner extended tire width TDWin falls in the range of (TDWout×1.02)≦TDWin≦(TDWout×1.50). This ensures the lateral width of the tread surface 11 on the vehicle-inner side in the tire width direction relative to the equatorial plane 5, i.e., the lateral width of a portion having a shape other than a profile resistant to rollover. Thus, when a large load acts on the tread surface 11, the ground contact area is increased on the vehicle-inner side in the tire width direction, while increase in ground contact area is prevented on the vehicle-outer side in the tire width direction.

Specifically, by making the inner extended tire width TDWin not less than 1.02 times as large as the outer extended tire width TDWout, the lateral width is ensured for the tread surface 11 on the vehicle-inner side in the tire width direction relative to the equatorial plane 5. This improves the friction force between the road surface and the tread surface 11 on the vehicle-inner side in the tire width direction under high load. Thus, the braking performance is further improved. On the other hand, by making the inner extended tire width TDWin not more than 1.50 times as large as the outer extended tire width TDWout, the lateral width is ensured for the tread surface 11 on the vehicle-outer side in the tire width direction relative to the equatorial plane 5. This prevents increase in ground contact area even when a large load acts on the tread surface 11 on the vehicle-outer side in the tire width direction when the vehicle turns. Thus, the rollover resistance is ensured.

As such, by arranging the relation between the outer extended tire width TDWout and the inner extended tire width TDWin to fall in the range of (TDWout×1.02)≦TDWin≦(TDWout×1.50), the ground contact area is increased on the vehicle-inner side in the tire width direction while increase in ground contact area is prevented on the vehicle-outer side in the tire width direction, when a large load acts on the tread surface 11. As a result, the braking performance is further improved, when improving the wear resistance and the braking performance while maintaining the rollover resistance.

Figure 6:
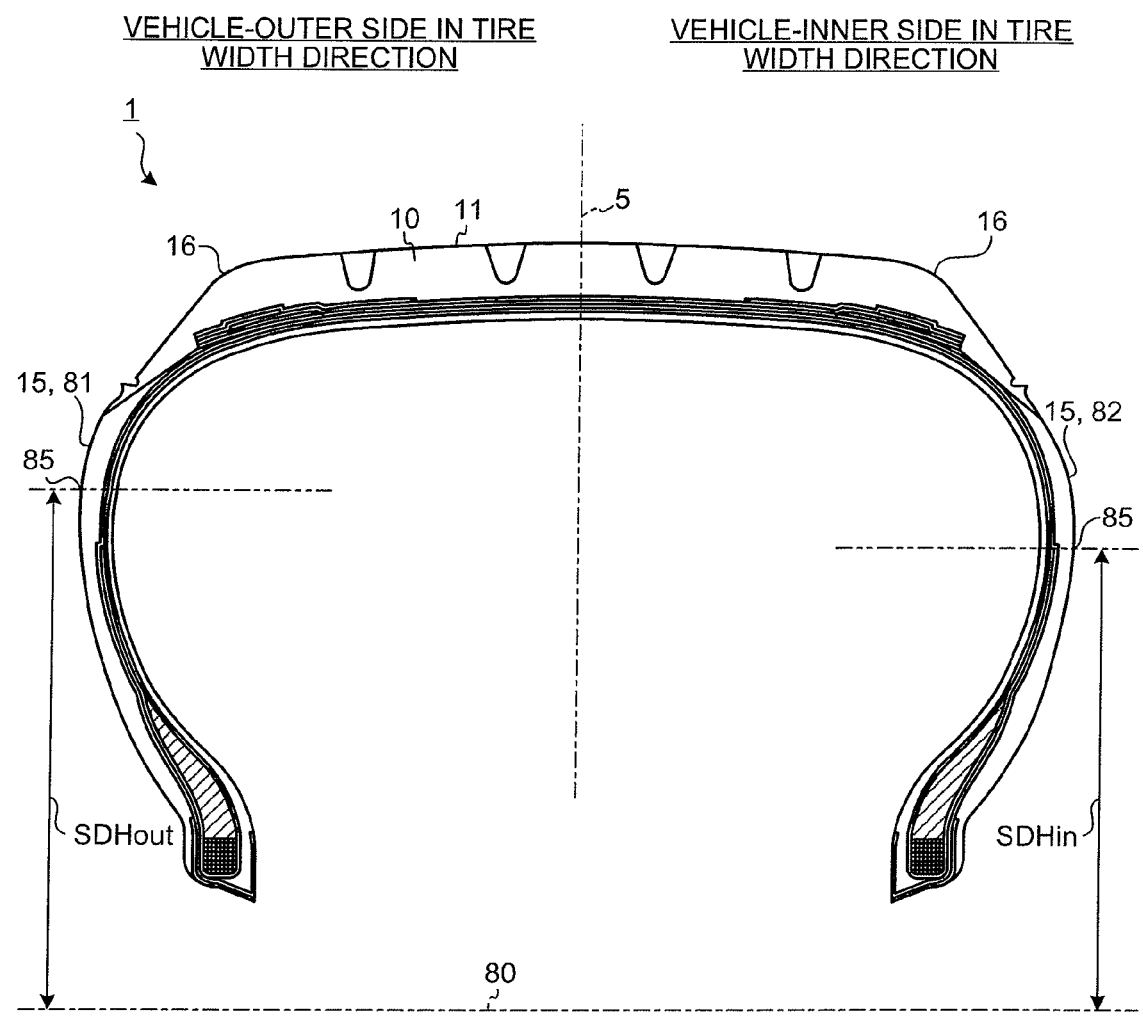
FIG. 6 is a drawing for explaining a modification of the pneumatic tire according to the embodiment.

FIG. 6 is a drawing for explaining a modification of the pneumatic tire according to the embodiment. In the pneumatic tire 1 according to the embodiment, the shape of the sidewalls 15 is not particularly specified. The profile of the sidewalls 15 may be specified in a similar manner that the profile of the tread surface 11 is specified. For example, as shown in FIG. 6, the sidewalls 15 located on the both tire-width-direction edges may have different profiles. Specifically, assuming that laterally outermost portions of the sidewalls 15 are tire maximum width positions 85, the tire maximum width positions 85 may be provided at different levels in the tire diameter direction, on the sidewalls 15 located on the both tire-width-direction edges. Specifically, a length SDHout of a perpendicular line that extends from one tire maximum width position 85 on an outer sidewall 81, serving as one sidewall 15 located on the vehicle-outer side in the tire width direction relative to the equatorial plane 5, to a rotation axis 80 may be greater than a length SDHin of a perpendicular line that extends from the other tire maximum width position 85 on an inner sidewall 82, serving as the other sidewall 15 located on the vehicle-inner side in the tire width direction relative to the equatorial plane 5, to the rotation axis 80.

In this manner, by providing the tire maximum width position 85 on the inner sidewall 82 higher in the tire diameter direction than the tire maximum width position 85 on the outer sidewall 81, the outer sidewall 81 has lower lateral stiffness than the inner sidewall 82.

Among pneumatic tires 1 attached to the both lateral sides of the vehicle, pneumatic tires 1 located outward in the turning radius direction, particularly portions located on the vehicle-outer side in the tire width direction relative to the equatorial plane 5, are easily affected by a large load when the vehicle turns. Thus, the outer sidewall 81 is easily affected by a large load when the vehicle turns. However, by providing low lateral stiffness in the outer sidewall 81, the maximum cornering force is reduced under high load, so that the rollover resistance is ensured under high load.

Further, vertical stiffness is ensured in the inner sidewall 82 because the length SDHin of the perpendicular line extending from the tire maximum width position 85 on the inner sidewall 82 to the rotation axis 80 is made shorter than the length SDHout of the perpendicular line extending from the tire maximum width position 85 on the outer sidewall 81 to the rotation axis 80. This allows the inner sidewall 82 to receive the load in the tire diameter direction during braking of the vehicle, thus lessening the contact pressure acting around the shoulder 16 during braking of the vehicle. Because the tread surface 11 can receive a larger load during braking of the vehicle, the braking performance is improved. As a result, the braking performance is improved while the rollover resistance is maintained.

In this manner, when the length SDHout of the perpendicular line extending from the tire maximum width position 85 on the outer sidewall 81 to the rotation axis 80 is made greater than the length SDHin of the perpendicular line extending from the tire maximum width position 85 on the inner sidewall 82 to the rotation axis 80, the difference between SDHout and SDHin is preferably in the range of 4 millimeters to 25 millimeters. Specifically, when the difference between SDHout and SDHin is given by S=SDHout−SDHin, the difference S is preferably in the range of 4 millimeters≦S≦25 millimeters. By arranging the difference S between the length SDHout of the perpendicular line extending from the tire maximum width position 85 on the outer sidewall 81 to the rotation axis 80 and the length SDHin of the perpendicular line extending from the tire maximum width position 85 on the inner sidewall 82 to the rotation axis 80 to fall in the range of 4 millimeters≦S≦25 millimeters, the rollover resistance is improved more reliably without reducing the handling stability.

Specifically, when the difference S between SDHout and SDHin is less than 4 millimeters, the difference in stiffness between the outer sidewall 81 and the inner sidewall 82 is small, which may provide less improvement in rollover. On the contrary, when the difference S between SDHout and SDHin is greater than 25 millimeters, the difference in stiffness between the outer sidewall 81 and the inner sidewall 82 becomes extremely large, which may reduce the handling stability. Thus, by arranging the difference S between SDHout and SDHin to fall in the range of 4 millimeters≦S≦25 millimeters, the rollover resistance is improved more reliably without reducing the handling stability. As a result, the rollover resistance is improved more reliably while the handling stability is maintained.

Figure 7:
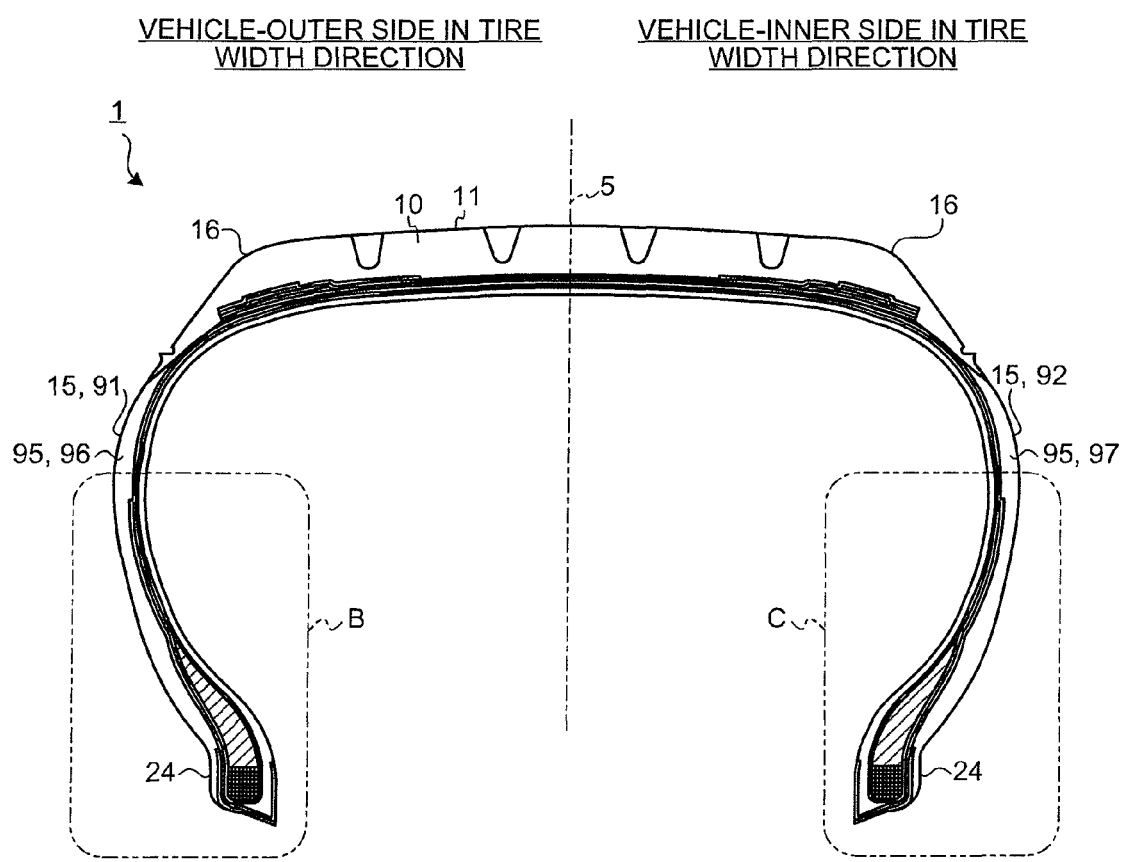
FIG. 7 is a drawing for explaining a modification of the pneumatic tire according to the embodiment.

FIG. 7 is a drawing for explaining a modification of the pneumatic tire according to the embodiment. The sidewalls 15 located on the both sides in the tire width direction may be made of different materials. For example, the sidewalls 15 respectively include side treads 95, made of rubber material and provided on the laterally outermost portions. The side treads 95 of the sidewalls 15 located on the both sides in the tire width direction may be arranged differently, as shown in FIG. 7.

Specifically, an outer side tread 96 serving as the side tread 95 of an outer sidewall 91 may have lower hardness than an inner side tread 97 serving as the side tread 95 of an inner sidewall 92. By arranging the outer side tread 96 to have lower hardness than the inner side tread 97, the stiffness is made small in the outer sidewall 91 serving as the sidewall 15 located on the vehicle-outer side in the tire width direction relative to the equatorial plane 5. This reduces the maximum concerning force under high load, thus ensuring the rollover resistance under high load.

By arranging the outer side tread 96 to have lower stiffness than the inner side tread 97, i.e., by arranging the inner side tread 97 to have higher stiffness than the outer side tread 96, the stiffness is ensured in the inner sidewall 92 that serves as the sidewall 15 located on the vehicle-inner side in the tire width direction relative to the equatorial plane 5. This allows the inner sidewall 92 to receive the load in the tire diameter direction during braking of the vehicle, thus lessening the contact pressure acting around the shoulder 16 during braking of the vehicle. Because the tread surface 11 can receive a larger load during braking of the vehicle, the braking performance is improved. As a result, the braking performance is improved while the rollover resistance is maintained.

When the outer side tread 96 and the inner side tread 97 are made to have such a difference in hardness, it is preferable that the outer side tread 96 be formed to have JIS A hardness of 42 to 52, and that the inner side tread 97 be formed to have JIS A hardness of 53 to 65. By arranging the outer side tread 96 to have JIS A hardness of 42 to 52, the stiffness of the outer sidewall 91 is reduced more reliably. This reduces the maximum cornering force under high load more reliably, thus ensuring the rollover resistance under high load. Further, by arranging the inner side tread 97 to have JIS A hardness of 53 to 65, the stiffness of the inner sidewall 92 is ensured more reliably.

This lessens the contact pressure acting around the shoulder 16 more reliably during braking of the vehicle, thus improving the braking performance.

By arranging the outer side tread 96 and the inner side tread 97 to have JIS A hardness of the above ranges, appropriate stiffness is ensured in the sidewalls 15 having different stiffness on the both tire-width-direction edges. This improves the stability when the vehicle travels. As a result, while the rollover resistance is maintained more reliably, the braking performance is improved, and further, the handling stability is improved.

The side treads 95 of the sidewalls 15 are preferably arranged such that the thickness of the outer side tread 96 is less than the thickness of the inner side tread 97 by 0.5 millimeter or more. Specifically, when the thickness of the outer side tread 96 and the thickness of the inner side tread 97 are compared by measuring the thicknesses thereof at the same level in the tire diameter direction, the thickness of the outer side tread 96 is preferably less than the thickness of the inner side tread 97 by 0.5 millimeter or more. In this manner, by arranging the outer side tread 96 to have a thickness less than the thickness of the inner side tread 97 by 0.5 millimeter or more, the stiffness of the outer sidewall 91 is reduced more reliably, and the stiffness of the inner sidewall 92 is ensured. As a result, the braking performance is improved while the rollover resistance is maintained more reliably.

Figure 8A:
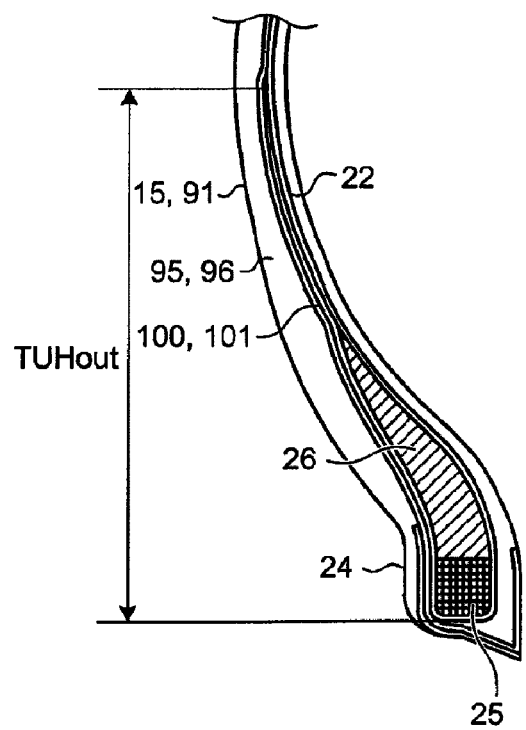
FIG. 8A is a detailed drawing of a B portion shown in FIG. 7.
Figure 8B:
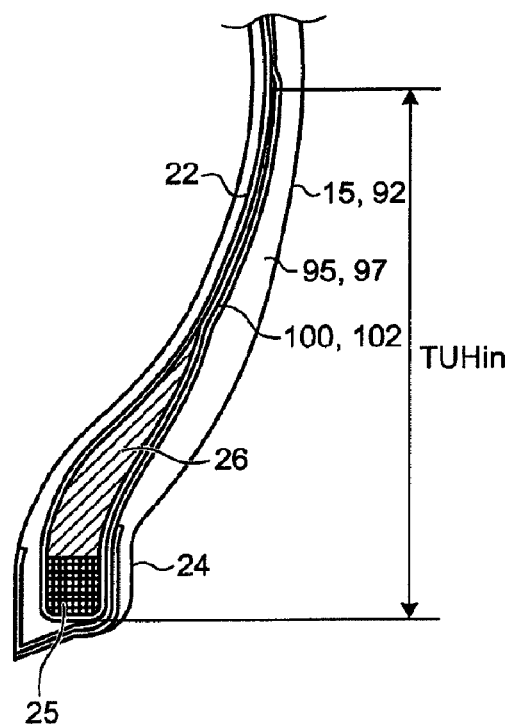

FIG. 8A is a detailed drawing of a B part shown in FIG. 7, and FIG. 8B is a detailed drawing of a C part shown in FIG. 7. On portions inner than the sidewalls 15 in the tire diameter direction are provided the beads 24 that include the bead cores 25. At the bead cores 25, the carcass 22 is folded back. Such folded sections on the both sides in the tire width direction may be made different from each other. Specifically, between the beads 24 on the both sides in the tire width direction is provided the carcass 22 that is spanned from one of the beads 24 to the other bead 24, and that includes turnups 100 serving as the folded sections where the carcass 22 is folded back outwardly in the tire width direction along the bead cores 25. The height of the turnups 100 on the both sides in the tire width direction may be made different from each other.

Specifically, provided that one of the turnups 100 on the both sides in the tire width direction, i.e., the turnup 100 on the vehicle-outer side in the tire width direction relative to the equatorial plane 5, is an outer turnup 101 having a height TUHout, and the other turnup 100, i.e., the turnup 100 on the vehicle-inner side in the tire width direction relative to the equatorial plane 5, is an inner turnup 102 having a height TUHin, the height TUHout is made less than the height TUHin. In this case, the turnups 100 are preferably arranged such that the height TUHout of the outer turnup 101 is less than the height TUHin of the inner turnup 102 by 5 millimeters or more. Further, the outer turnup 101 and the inner turnup 102 are arranged such that the outer turnup 101 is provided on the outer sidewall 91 and the inner turnup 102 is provided on the inner sidewall 92.

In the carcass 22, by arranging the turnups 100 located on the both sides in the tire width direction to have different heights, the stiffness is adjusted for the sidewalls 15 including the turnups 100. Specifically, by making the height TUHout of the outer turnup 101 less than the height TUHin of the inner turnup 102 by 5 millimeters or more, the outer sidewall 91 including the outer turnup 101 has lower stiffness than the inner sidewall 92 including the inner turnup 102. This causes a small load around the tread surface 11 on the vehicle-outer side in the tire width direction, thus reducing the maximum cornering force under high load and ensuring the rollover resistance under high load. Further, because the inner sidewall 92 can receive the load in the tire diameter direction, the contact pressure acting around the shoulder 16 during braking of the vehicle is lessened. Thus, the braking performance is improved. As a result, the braking performance is improved while the rollover resistance is maintained.

FIG. 9 is a drawing for explaining a modification of the pneumatic tire according to the embodiment. In the pneumatic tire 1 according to the embodiment, although grooves formed in the tread 10 are not particularly specified, the tread surface 11 formed to have the above shape may have a specified groove shape(s). For example, in the pneumatic tire 1 shown in FIG. 9, a plurality of main grooves 110 extending in the tire circumferential direction and a plurality of lugs 115 extending in the tire width direction are formed in the tread surface 11 of the tread 10. Further, in the tread surface 11 is also formed a plurality of land portions 120 segmented by the main grooves 110 and the lugs 115.

In the main grooves 110, wear indicators 112 are provided at predetermined locations in the tire circumferential direction so that their groove bottoms protrude outwardly in the tire diameter direction. Each of the wear indicators 112 is formed to have a width in the tire circumferential direction being nearly the same as the groove width of each main groove 110. Further, plural sets of the wear indicators 112 are provided in each main groove 110. In the main grooves 110, portions including the wear indicators 112 serve as main-groove bottom up sections 111 where the groove depth is small.

Figure 10:
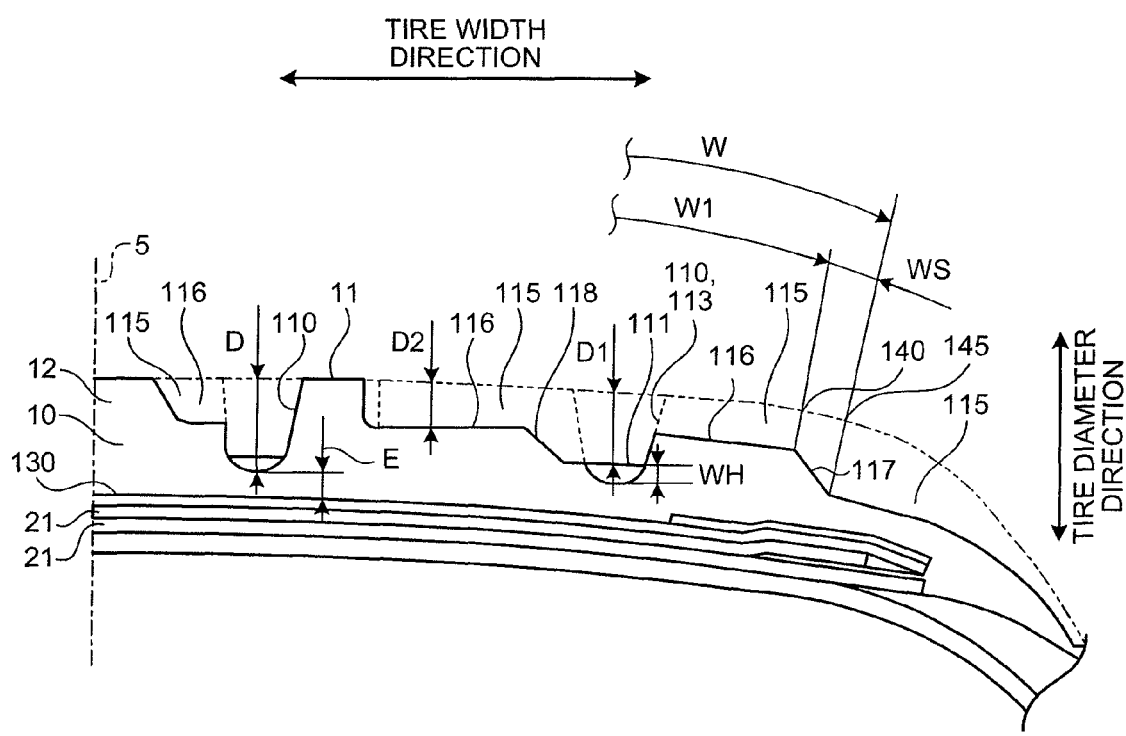
FIG. 10 is a cross-sectional view taken along J-J of FIG. 9.

FIG. 10 is a cross-sectional view taken along J-J of FIG. 9. In the lugs 115 are provided lug bottom up sections 116 where the groove depth is less than the other portions of the lugs 115. The lug bottom up sections 116 are formed such that, in a portion located within the lateral contact width of the tread surface 11 under low load, i.e., within a low-load contact width W1, the lugs 115 have a groove depth D2 that is 50% to 70% of an effective groove depth D1 that is the groove depth of the main grooves 110 including the main-groove bottom up sections 111. Specifically, the effective groove depth D1 is found by subtracting a height WH of the wear indicators 112 from a main groove depth D, as given by a relation D1=(D−WH). The relation between the effective groove depth D1 and the groove depth D2 of the lugs 115 falls in the range of 0.5D1≦D2≦0.7D1.

Further, in each lug bottom up section 116 located outer than the low-load contact width W1 in the tire width direction, an outer inclined section 117 is formed such that its groove bottom is inclined from a low-load contact edge 140 serving as a lateral edge of the low-load contact width W1, and that the groove depth D2 of the lug 115 is increased from the low-load contact edge 140 outwardly in the tire width direction. Specifically, the outer inclined section 117 is formed such that the groove depth D2 of the lug 115 is gradually increased across the tire width direction from the location of the low-load contact edge 140 to a medium-load contact width edge 145 serving as a lateral edge of a medium-load contact width W. The medium-load contact width W is a lateral contact width of the tread surface 11 under medium load.

Specifically, in an inclination range WS ranging from the location of the low-load contact edge 140 to the location of the medium-load contact width edge 145 across the tire width direction, the groove depth D2 of the lug 115 is gradually increased along the outer inclined section 117, from the low-load contact edge 140 to the medium-load contact width edge 145. The medium load refers to a load of about 70% of the maximum load, and the extent of the inclination range WS is given by WS=(W−W1)/2.

Among the main grooves 110, the main groove 110 located in each lateral outermost portion is an outermost main groove 113. Among the lugs 115, each lug 115 connected to the outermost main groove 113 from inside in the tire width direction includes an inner inclined section 118 formed on the lug bottom up section 116. The inner inclined section 118 is located near the outermost main groove 113, and is formed to have the same lateral width as the lateral width of the outer inclined section 117. Further, the inner inclined section 118 is formed to have a groove bottom being inclined such that the groove depth D2 of the lug 115 is outwardly increased in the tire width direction. In other words, in the inner inclined section 118, the groove depth D2 is largest at its edge closer to the outermost main groove 113, and is gradually made smaller from the outermost main groove 113 toward the equatorial plane 5. The lateral width of the inner inclined section 118 may be nearly the same as either the lateral width of the outer inclined section 117 or the lateral width of the inclination range WS, and need not be exactly the same as such width.

In this manner, within the low-load contact width W1, the lug bottom up sections 116 are formed in the lugs 115 such that the groove depth D2 of the lugs 115 is in the range of 50% to 70% of the effective groove depth D1. This improves the stiffness of the tread 10 located within the low-load contact width W1, thus increasing the maximum cornering force under low load. Further, as to the lug bottom up sections 116, at a portion located outer than the low-load contact width W1 in the tire width direction, the outer inclined section 117 is formed such that the groove depth D2 of the lugs 115 is increased from the low-load contact edge 140 outwardly in the tire width direction. This prevents the tread 10 from having increased stiffness at a contact patch being increased under high load, compared with at a contact patch under low load. Thus, increase in cornering force is prevented under high load. Further, in the lugs 115, the outer inclined section 117 is formed in a portion located outer than the low-load contact width W1 in the tire width direction. This ensures water discharge through the lugs 115. As a result, the handling stability and the rollover resistance are maintained without degrading the wet performance.

Particularly, when pneumatic tires 1 so configured are attached to a front engine front drive (FF) vehicle, increased cornering force is provided on rear wheels. This ensures the stability when the vehicle travels. Thus, the handling stability and the rollover resistance are improved more effectively.

Further, by forming the inner inclined section 118 in the lug bottom up section 116 of the lug 115 connected to the outermost main groove 113 from inside in the tire width direction, the water discharge from the lugs 115 to the outermost main groove 113 is ensured despite the lug bottom up sections 116 provided in the lugs 115. As a result, the handling stability and the rollover resistance are improved more reliably without degrading the wet performance.

In many cases, a belt cover layer 130 is provided radially outward of the belt layers 21. When the main grooves 110 and the lugs 115 are provided in the tread surface 11, it is preferable the distance between a radially innermost portion of these grooves and the belt cover layer 130 be equal to or greater than 0.5 millimeter. For example, when the radially innermost portion of the main grooves 110 and the lugs 115 is the groove bottom of the main grooves 110, a distance E between the groove bottom of the main grooves 110 and the belt cover layer 130 is preferably equal to or greater than 0.5 millimeter. When the radially innermost portion of the grooves is the groove bottom of the main grooves 110 and also the distance E between the groove bottom of the main grooves 110 and the belt cover layer 130 is less than 0.5 millimeter, cracking may easily occur in the groove bottom. On the contrary, when the distance E between the groove bottom of the main grooves 110 and the belt cover layer 130 is made equal to or greater than 0.5 millimeter, such cracking is prevented in the groove bottom, so that durability is improved.

The compound forming the cap tread 12 preferably has JIS A hardness of 60 to 80 and 100% tensile modulus of 1.5 MPa to 4.5 MPa. By arranging the compound of the cap tread 12 to fall in such ranges, the cornering force is reduced under high load more reliably, and the handling stability is improved. Specifically, when the compound forming the cap tread 12 has JIS A hardness greater than 80, the tread 10 may have extremely high stiffness in the tire diameter direction, and therefore the cornering force may not effectively be reduced under high load. On the contrary, when the compound forming the cap tread 12 has JIS hardness less than 60, the tread 10 may have extremely low stiffness in the tire diameter direction and in the tire width direction. Accordingly, good response may not be obtained in neutral state, causing difficulties in improving the handling stability.

Thus, by arranging the compound of the cap tread 12 to fall in the above ranges, the cornering force is reduced under high load more reliably, and the handling stability is improved. As a result, the handling stability and the rollover resistance are improved without degrading the wet performance. Particularly for the cap tread 12, a compound having JIS A hardness of 70 and 100% tensile modulus of 2.5 MPa is preferably used. In this case, reduction in cornering force under high load and improvement in handling stability are both realized at high levels.

The cap tread 12 is preferably arranged such that a portion located within the low-load contact width W1 has greater JIS A hardness than a portion located outer than the low-load contact width W1 in the tire width direction by JIS A hardness of 5 to 20. Particularly, such difference in hardness is 10 more preferably. By arranging the cap tread 12 to have JIS A hardness being different within and outside the low-load contact width W1, increased stiffness is provided in the cap tread 12 that makes contact with the ground under low load. Accordingly, the contact patch under high load has lower stiffness than the contact patch under low load. Thus, the maximum cornering force is reduced under high load, while being increased under low load more reliably. This improves the rollover resistance more reliably.

Such difference in JIS A hardness is preferably made suitable for the front wheels and for the rear wheels to be attached to the vehicle. By adjusting the difference in hardness, the handling stability is further improved. Particularly, when a front axle weight is greater than a rear axle weight, by adjusting the difference in JIS A hardness, the rollover resistance and the handling stability are both improved more reliably.

Figure 11:
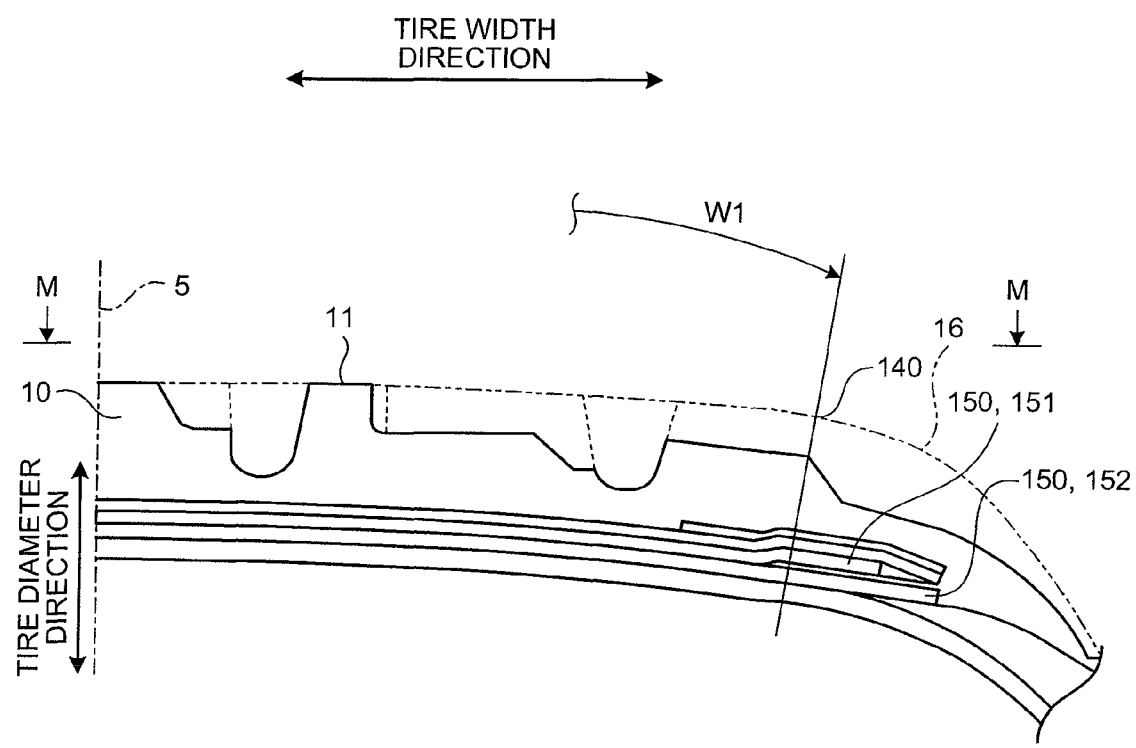
FIG. 11 is a drawing for explaining a modification of the pneumatic tire according to the embodiment.
Figure 12:
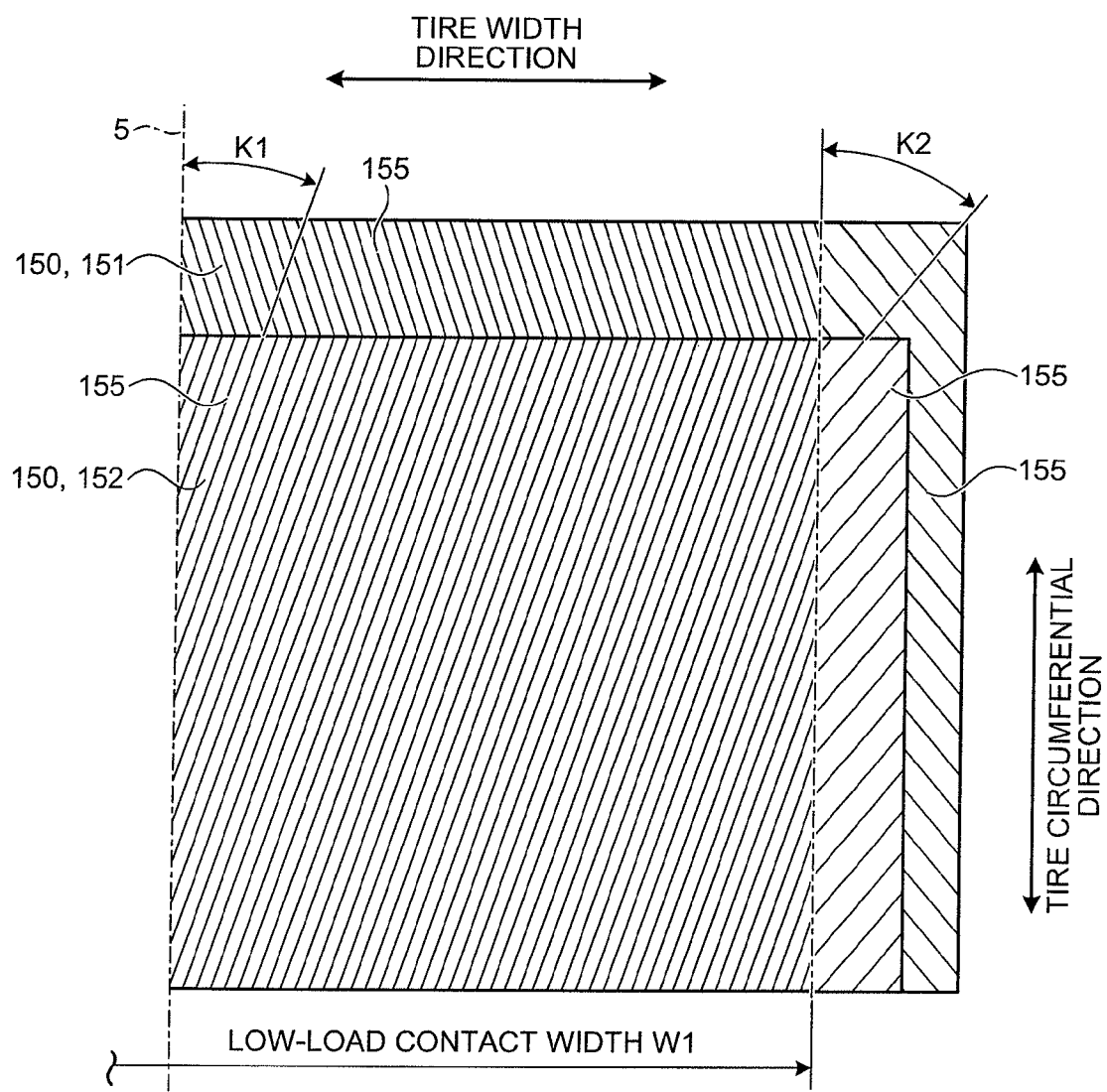
FIG. 12 is a drawing for explaining a belt layer seen from a direction M-M indicated in FIG. 11.

FIG. 11 is a drawing for explaining a modification of the pneumatic tire according to the embodiment. FIG. 12 is a drawing for explaining a belt layer seen from a direction M-M indicated in FIG. 11. In the pneumatic tire 1 according to the embodiment, the configuration of the belt layers 21 is not particularly specified. The tread surface 11 may have the shape as described above, and further, the configuration of the belt layers 21 may be specified. For example, in the pneumatic tire 1 shown in FIGS. 11 and 12, on the inner side of the tread 10 in the tire diameter direction is provided a plurality of belt layers 150 including belt cords 155. In the belt layers 150, an angle of the belt cords 155 located within the low-load contact width W1 with respect to the tire circumferential direction is made smaller than an angle of the belt cords 155 located outer than the low-load contact width W1 in the tire width direction with respect to the tire circumferential direction by 3° to 10°.

Specifically, in the pneumatic tire 1 shown in FIGS. 11 and 12, a first belt layer 151 and a second belt layer 152 are provided as the belt layers 150. To explain the belt layers using the second belt layer 152, an angle K1 of the belt cords 155 located within the low-load contact width W1 with respect to the tire circumferential direction is smaller than an angle K2 of the belt cords 155 located outer than the low-load contact width W1 in the tire width direction with respect to the tire circumferential direction by 3° to 10°.

By arranging the angle K1 of the belt cords 155 in the belt layers 150 within the low-load contact width W1 with respect to the tire circumferential direction to be smaller than the angle K2 of the belt cords 155 in the belt layers 150 outer than the low-load contact width W1 in the tire width direction with respect to the tire circumferential direction, higher stiffness is provided in the cap tread 12 that makes contact with the ground under low load. Accordingly, the contact patch under high load has lower stiffness than the contact patch under low load.

Specifically, by forming such angles with the belt cords 155 of the belt layers 150, high internal bending stiffness is provided in the belt surface within the low-load contact width W1, so that internal bending stiffness is reduced in the belt surface in the contact patch under high load. This prevents variation in ground contact length around the shoulder 16, providing a small ground contact area under high load. Thus, the maximum cornering force is reduced under high load while being increased under low load more reliably. This improves the rollover resistance more reliably.

The angular difference of the belt cords 155 is preferably made suitable for the front wheels and for the rear wheels to be attached to the vehicle. By adjusting the angular difference, the handling stability is further improved. Particularly, for a vehicle having a greater front axle weight than a rear axle weight, by adjusting the angular difference in the belt cords 155, the rollover resistance and the handling stability are both improved more reliably.

Examples

The following describes performance evaluation tests conducted using pneumatic tires 1 according to the present invention and pneumatic tires to be compared as comparative examples with the pneumatic tires 1 according to the present invention. Seven types of performance evaluation tests were conducted. For each test, a double-lane change test, and test run on a test course were performed.

As one of the seven performance evaluation tests, a first test method was conducted such that pneumatic tires 1 of size 205/45R17 were mounted on rims, then attached to a vehicle with an engine size of 1500 cc, and test run was performed. An evaluation method for each test item was conducted by performing a double-lane change test (elk test) specified by ISO3888-2 on the vehicle with the test pneumatic tires, and then by determining rollover resistance depending on whether the wheels of the vehicle were lifted up. Determination was made as indicated by circles for wheels not lifted up at a test speed of 60 km/h, and cross marks for wheels lifted up. Wheels indicated by circles were determined as having good rollover resistance.

The wear resistance was tested such that a vehicle with the test pneumatic tires 1 attached was driven 10,000 kilometers on a dry road surface, and then the amount of wear was measured in each pneumatic tire 1. The evaluation of the wear resistance is indicated as index values using a measurement result of the pneumatic tire 1 according to Comparative Example 1 (described later) as 100. Greater index values indicate more excellent wire resistance.

The braking performance was tested on a vehicle with the test pneumatic tires 1, by measuring a distance required to stop from a speed of 100 km/h. The evaluation of the braking performance is indicated as index values using a braking distance of the pneumatic tires 1 according to Comparative Example 1 (described later) as 100. Greater index values indicate more excellent braking performance.

With the above method, the tests were performed on the test pneumatic tires 1 including four types of the present invention, and two types of comparative examples to be compared with the present invention. The test pneumatic tires 1 were such that, in all of Present Inventions 1 to 4, F1, F2, F3, and F4 fell in the ranges of $(0.64 \leq F1 \leq 0.7)$, $(1.2 \leq F2 \leq 2.0)$, $(0.1 \leq F3 \leq 0.2)$, and $(0.35 \leq F4 \leq 0.48)$, respectively, whereas in Comparative Examples 1 and 2, F1 and F3 fell outside of the ranges of $(0.64 \leq F1 \leq 0.7)$ and $(0.1 \leq F3 \leq 0.2)$, respectively. In these pneumatic tires 1, the values of F1, F2, F3, and F4 were the same between Comparative Examples 1 and 2, between Present Inventions 1 and 2, and between Present Inventions 3 and 4. Further, in the respective pairs, tan δ of the rubber forming the cap tread 12 is smaller in Comparative Example 2, Present Invention 2, and Present Invention 4 than in Comparative Example 1, Present Invention 1, and Present Invention 3, respectively. This tan δ is a value obtained at 60° C.

The pneumatic tires 1 according to Comparative Examples 1 and 2 and Present Inventions 1 to 4 were tested and evaluated with the above method, and obtained results are shown in FIG. 13.

As apparent from the test results shown in FIG. 13, in the double-lane change test, the tested pneumatic tires 1 were proved to be able to make a double-lane change. Therefore, all the pneumatic tires 1 maintained rollover resistance. On the contrary, as shown by the test results in FIG. 13, when F1 and F3 fell outside of the ranges of $(0.64 \leq F1 \leq 0.7)$ and $(0.1 \leq F3 \leq 0.2)$ and further tan δ was small, the rollover resistance and the braking performance were not improved (Comparative Example 2).

On the contrary, in Present Invention 1, wear resistance and braking performance were improved compared with Comparative Example 1. Further, it was indicated that even with a rubber having small tan δ, Present Invention 2 achieved nearly the same braking performance as Comparative Example 1 using a rubber having large tan δ. Specifically, it was indicated that, even when a rubber having small tan δ was used for the cap tread 12, the braking performance was maintained. In Present Inventions 3 and 4, TDW was increased and thus L1, TR1, and TR2 were optimized, so that wear resistance and braking performance were further improved. As apparent from these test results, by arranging F1, F2, F3, and F4 to fall in the ranges of $(0.64 \leq F1 \leq 0.7)$, $(1.2 \leq F2 \leq 2.0)$, $(0.1 \leq F3 \leq 0.2)$, and $(0.35 \leq F4 \leq 0.48)$, the wear resistance and the braking performance were improved while the rollover resistance was maintained.

As one of the seven performance evaluation tests, a second test method was conducted such that pneumatic tires 1 of size 185/60R15 were mounted on rims, then attached to a vehicle with an engine size of 1300 cc, and test run was performed. As in the first performance evaluation test, the evaluation method for this performance evaluation test was conducted by performing a double-lane change test specified by ISO3888-2 on the vehicle with the pneumatic tires 1, and then determining rollover resistance depending on whether the wheels of the vehicle were lifted up. Determination was made as indicated by cross marks for wheels lifted up, and circles for wheels not lifted up at a test speed of 60 km/h, and double circles for wheels not lifted up at a test speed of 62 km/h. Wheels indicated by circles and double circles were determined as having excellent rollover resistance. Further, in this evaluation method, wheels not lifted up even at a high test speed were determined as having excellent rollover resistance. Thus, wheels indicated by double circles were determined as having more excellent rollover resistance than those indicated by circles.

In this performance evaluation test, wear resistance and braking performance were tested and evaluated with the same method as the first test method. The evaluation of the wear resistance is indicated as index values using a measurement result of pneumatic tires 1 according to Comparative Example 3 (described later) as 100, and greater index values indicate more excellent wear resistance. Similarly, the evaluation of the braking performance is also indicated as index values using a braking distance of pneumatic tires 1 according to Comparative Example 3 (described later) as 100, and greater index values indicate more excellent braking performance.

With the above method, these tests were performed on the pneumatic tires 1 including eight types of the present invention, i.e., Present Inventions 5 to 12, and two types of comparative examples, i.e., Comparative Examples 3 and 4. In Comparative Examples 3 and 4, the tread surface 11 had the same profile as the pneumatic tires 1 according to Comparative Example 1 that were tested and evaluated with the first test. On the contrary, in Present Inventions 5 to 12, the tread surface 11 has the same profile as the pneumatic tires 1 according to Present Invention 1 that were tested and evaluated with the first test. These test pneumatic tires 1 were formed of either type of rubbers forming the cap tread 12 and made of raw materials blended differently.

Specifically, for a rubber forming the cap tread 12 of the pneumatic tires 1 tested and evaluated with the second test method, either of rubbers was used: rubber A being a general rubber often used as the rubber for the cap tread 12; and rubber B being a high performance tire (HPT) rubber made of raw materials that are blended to achieve better grip performance than the rubber A. FIGS. 14A and 14B depict the compositions of the raw materials of the rubbers A and B (blending quality is indicated as a weight ratio relative to rubber weight 100), in which FIG. 14A depicts the compositions of the rubber A and FIG. 14B depicts the composition of the rubber B.

The pneumatic tires 1 tested and evaluated with the second test method differed from one another regarding: JIS A hardness (JIS K6253) of the base rubber layer 61; and the cross section ratio of the base rubber layer 61 to the tread rubber 60 (hereinafter, cross section ratio).

The pneumatic tires 1 according to Comparative Examples 3 and 4 and Present Inventions 5 to 12 were tested and evaluated with the above method. Obtained results are shown in FIGS. 15A and 15B, in which FIG. 15A depicts results of the evaluation tests of Comparative Examples 3 and 4 and Present Inventions 5 to 7, and FIG. 15B depicts results of the evaluation tests of Present Inventions 8 to 12.

As apparent from the test results shown in FIGS. 15A and 15B, regardless of the configuration of rubbers forming the tread 10, the wear resistance and the braking performance were improved while the rollover resistance was maintained, when the tread surface 11 was formed to a have profile achieving F1, F2, F3, and F4 falling in the ranges of ($0.64 \leq F1 \leq 0.7$), ($1.2 \leq F2 \leq 2.0$), ($0.1 \leq F3 \leq 0.2$), and ($0.35 \leq F4 \leq 0.48$), respectively (Present Inventions 5 to 12). Further, the rollover resistance was improved more reliably when the JIS A hardness was in the range of 48 to 60, the cross section ratio of the base rubber layer 61 to the tread rubber 60 was in the range of 20% to 50%, and the rubber A was used for the cap tread 12 (Present Inventions 5 and 6).

As one of the seven performance evaluation tests, a third test method was conducted as in the second test method such that pneumatic tires 1 of size 185/60R15 were mounted on rims, then attached to a vehicle with an engine size of 1300 cc, and test run was performed. As in the second test method, the evaluation method of this performance evaluation test was conducted by testing and evaluating rollover resistance, wear resistance, and braking performance. The evaluation of the wear resistance is indicated as index values using a measurement result of pneumatic tires 1 according to Comparative Example 5 (described later) as 100, and greater index values indicate more excellent wear resistance. Similarly, the evaluation of the braking performance is indicated as index values using a braking distance of the pneumatic tires 1 according to Comparative Example 5 (described later) as 100, and greater index values indicate more excellent braking performance.

With the above method, these tests were performed on the pneumatic tires 1 including seven types of the present invention, i.e., Present Inventions 13 to 19, and two types of comparative examples, i.e., Comparative Examples 5 and 6. In Comparative Examples 5 and 6, the tread surface 11 had the same profile as the pneumatic tires 1 according to Comparative Example 1 that were tested and evaluated with the first test. On the contrary, in Present Inventions 13 to 19, the tread surface 11 had the same profile as the pneumatic tires 1 according to Present Invention 1 tested and evaluated with the first test.

The pneumatic tires 1 tested and evaluated with the third test method differed from one another regarding: the filler height FH of the bead fillers 26; JIS A hardness (JIS K6253) Hs of the bead fillers 26 at room temperature; and the value of G calculated by Formula (16) above.

The pneumatic tires 1 according to Comparative Examples 5 and 6 and Present Inventions 13 to 19 were tested and evaluated with the above method. Obtained results are shown in FIGS. 16A and 16B, in which FIG. 16A depicts the results of the evaluation tests of Comparative Examples 5 and 6 and Present Inventions 13 to 15, and FIG. 16B depicts the results of the evaluation tests of Present Inventions 16 to 19.

As apparent from the test results shown in FIGS. 16A and 16B, the wear resistance and the braking performance were improved while the rollover resistance was maintained, when the tread surface 11 was formed to a have profile that achieves F1, F2, F3, and F4 falling in the ranges of ($0.64 \leq F1 \leq 0.7$), ($1.2 \leq F2 \leq 2.0$), ($0.1 \leq F3 \leq 0.2$), and ($0.35 \leq F4 \leq 0.48$), respectively (Present Inventions 13 to 19).

As one of the seven performance evaluation tests, a fourth test method was conducted as in the first test method such that pneumatic tires 1 of size 205/45R17 were mounted on rims, then attached to a vehicle with an engine size of 1500 cc, and test run was performed. As in the first test method, the evaluation method of this performance evaluation test was conducted by testing and evaluating rollover resistance, wear resistance, and braking performance. The evaluation of the wear resistance is indicated as index values using a measurement result of pneumatic tires 1 according to Present Invention 20 (described later) as 100, and greater index values indicate more excellent wear resistance. Similarly, the evaluation of the braking performance is indicated as index values using a braking distance of the pneumatic tires 1 according to Present Invention 20 (described later) as 100, and greater index values indicate more excellent braking performance.

With the above method, these tests were performed on the pneumatic tires 1 including five types of the present invention, i.e., Present Inventions 20 to 24. In Present Invention 20, the tread surface 11 had the profile that was symmetrical in the tire width direction with respect to the equatorial plane 5, and was formed as a profile resistant to rollover. On the contrary, in Present Inventions 21 to 24, the tread surface 11 had the profile that was asymmetrical in the tire width direction with respect to the equatorial plane 5, and was formed such that only the tread surface 11 located on the vehicle-outer side in the tire width direction had a profile resistant to rollover. Further, in Present Inventions 23 and 24, the relation between the outer extended tire width TDWout and the inner extended tire width TDWin fell in the range of (TDWout× $1.02) \leq$ TDWin $\leq$ (TDWout×1.50), whereas in the Present Inventions 21 and 22, the relation between the outer extended tire width TDWout and the inner extended tire width TDWin fell outside of this range.

The pneumatic tires 1 according to Present Inventions 20 to 24 were tested and evaluated with the above method, and obtained results are shown in FIG. 17.

As apparent from the test results shown in FIG. 17, even when only the tread surface 11 located on the vehicle-outer side in the tire width direction relative to the equatorial plane 5 had a profile resistant to rollover, the wear resistance and the braking performance were improved while the rollover resistant was maintained. Further, when only the tread located on the vehicle-outer side in the tire width direction had a profile resistant to rollover, and also when the relation between the outer extended tire width TDWout and the inner extended tire width TDWin fell in the range of (TDWout×1.02) $\leq$ TDWin $\leq$ (TDWout×1.50), the width was ensured for the tread surface 11 on the vehicle-inner side in the tire width direction relative to the equatorial plane 5, i.e., for a portion formed to have a shape other than a profile resistant to rollover. Accordingly, the ground contact area was ensured under high load, so that the braking performance was improved. As a result, the braking performance was further improved, when improving the wear resistance and the braking performance while maintaining the rollover resistance (Present Inventions 23 and 24).

As one of the seven performance evaluation tests, a fifth test method was conducted as in the first test method such that pneumatic tires 1 of size 205/45R17 were mounted on rims, then attached to a vehicle with an engine size of 1500 cc, and test run was performed. As in the second test method, the evaluation method of this performance evaluation test was conducted by testing and evaluating rollover resistance, wear resistance, and braking performance. The evaluation of the wear resistance is indicated as index values using a measurement result of pneumatic tires 1 according to Comparative Example 7 (described later) as 100, and greater index values indicate more excellent wear resistance. Similarly, the evaluation of the braking performance is indicated as index values using a braking distance of the pneumatic tires 1 according to Comparative Example 7 (described later) as 100, and greater index values indicate more excellent braking performance.

With the above method, these tests were performed on the pneumatic tires 1 including four types of the present invention, i.e., Present Inventions 25 to 28, and one type of a comparative example, i.e., Comparative Example 7. In Comparative Example 7, the tread surface 11 had the same profile as the pneumatic tires 1 according to Comparative Example 1 that were tested and evaluated with the first test. On the contrary, in all of Present Inventions 25 to 28, the tread surface 11 was formed to have a profile resistant to rollover, and only a difference lied in that the profile of the tread surface 11 was either symmetrical or asymmetrical in the tire width direction on both sides of the equatorial plane 5. Specifically, in Present Inventions 25 and 26, the profile of the tread surface 11, i.e., a tread profile, was symmetrical in the tire width direction on both sides of the equatorial plane 5, whereas in Present Inventions 27 and 28, the tread profile was asymmetrical in the tire width direction on both sides of the equatorial plane 5. Further, Present Inventions 25 to 28 were arranged such that Present Inventions 25 and 26 had identical tread profiles, and Present Inventions 27 and 28 had identical tread profiles.

Further, the test pneumatic tire 1 differed in that side profiles contouring the respective sidewalls 15, located on the both sides in the tire width direction, were either symmetrical or asymmetrical. Specifically, the side profiles of the sidewalls 15 located on the both sides in the tire width direction were symmetrical in Comparative Example 7 and Present Inventions 25 and 27, whereas the side profiles of the sidewalls 15 located on the both sides in the tire width direction were asymmetrical in Present Inventions 26 and 28. Specifically, in Present Inventions 25 and 27, in the tire diameter direction, the height of the tire maximum width position 85 on the outer sidewall 81 is greater than the height of the tire maximum width position 85 on the inner sidewall 82 by the distance S of 5 millimeters.

The pneumatic tires 1 according to Comparative Example 7 and Present Inventions 25 to 28 were tested and evaluated with the above method, and obtained results are shown in FIG. 18.

As apparent from the test results shown in FIG. 18, by arranging the side profiles of the sidewalls 15 located on the both sides in the tire width direction to be asymmetrical, and also arranging the tire maximum width position 85 on the outer sidewall 81 to be higher than the tire maximum width position 85 on the inner sidewall 82, the outer sidewall 81 had lower stiffness than the inner sidewall 82. With this arrangement, the load acting around the tread surface 11 on the vehicle-outer side in the tire width direction was reduced, and the maximum cornering force was reduced under high load, with the result that rollover resistance was ensured under high load. Further, the contact pressure acting around the shoulder 16 during braking of the vehicle was lessened, so that the braking performance was improved. As a result, the rollover resistance was further improved, when improving the braking performance while maintaining the rollover resistance (Present Inventions 26 and 28). Further, because the contact pressure acting around the shoulder 16 during braking of the vehicle was lessened, the amount of wear in the tread surface 11 was reduced, so that wear resistance was improved.

As one of the seven performance evaluation tests, a sixth test method was conducted as in the first test method such that pneumatic tires 1 of size 205/45R17 were mounted on rims, then attached to a vehicle with an engine size of 1500 cc, and test run was performed. As in the second test method, the evaluation method of this performance evaluation test was conducted by testing and evaluating rollover resistance, wear resistance, and braking performance. The evaluation of the wear resistance is indicated as index values using a measurement result of pneumatic tires 1 according to Comparative Example 8 (described later) as 100, and greater index values indicate more excellent wear resistance. Similarly, the evaluation of the braking performance is indicated as index values using a braking distance of the pneumatic tires 1 according to Comparative Example 8 (described later) as 100, and greater index values indicate more excellent braking performance.

In the sixth test method, a performance evaluation test was also conducted regarding handling stability. As the method for testing the handling stability, a vehicle with the pneumatic tires 1 for the performance evaluation test were driven in a test course including a flat circuit at a speed of 60 km/h to 100 km/h, and a sensory testing was performed by three professional observers regarding: the steering when making a lane change and a turn; and the stability when driving straight. The evaluation results are indicated as index values using a result of Comparative Example 8 (described later) as 100, and greater index values indicate more excellent handling stability.

With the above method, these tests were performed on the pneumatic tires 1 including seven types of the present invention, i.e., Present Inventions 29 to 35, and one type of a comparative example, i.e., Comparative Example 8. In Comparative Example 8, the tread surface 11 had the same profile as the pneumatic tires 1 according to Comparative Example 1 that were tested and evaluated with the first test. On the contrary, in all of Present Inventions 29 to 35, the tread surface 11 was formed to have a profile resistant to rollover, and only a difference lied in that the profile of the tread surface 11 was either symmetrical or asymmetrical in the tire width direction on both sides of the equatorial plane 5. Specifically, in Present Inventions 29 and 30, the tread profile was symmetrical in the tire width direction on both sides of the equatorial plane 5, whereas in Present Inventions 31 to 35, the tread profile was asymmetrical in the tire width direction on both sides of the equatorial plane 5. Further, Present Inventions 29 to 35 were arranged such that Present Inventions 29 and 30 had identical tread profiles, and Present Inventions 31 to 35 had identical tread profiles.

Further, the test pneumatic tires 1 differed in that side profiles of the respective sidewalls 15 located on the both sides in the tire width direction were either symmetrical or asymmetrical. Specifically, the side profiles of the sidewalls 15 located on the both sides in the tire width direction were symmetrical in Comparative Example 8 and Present Inventions 29, 30, and 33, whereas the side profiles of the sidewalls 15 located on the both sides in the tire width direction were asymmetrical in Present Inventions 31, 32, 34, and 35.

Among the test pneumatic tires 1, some were the same and some were different regarding the hardness of the side treads 95 of the sidewalls 15 located on the both sides in the tire width direction. Specifically, in Comparative Example 8 and Present Invention 33, the outer side tread 96 and the inner side tread 97 had the same JIS hardness (JIS A hardness), whereas in Present Inventions 29 to 32 and Present Inventions 34 and 35, the outer side tread 96 had lower JIS hardness than the inner side tread 97.

The pneumatic tires 1 according to Comparative Example 8 and Present Inventions 29 to 35 were tested and evaluated with the above method. Obtained results are shown in FIGS. 19A and 19B, in which FIG. 19A depicts results of the evaluation tests of Comparative Example 8 and Present Inventions 29 to 31, and FIG. 19B depicts results of the evaluation tests of Present Inventions 32 to 35.

As apparent from the test results shown in FIGS. 19A and 19B, by providing lower stiffness in the outer side tread 96 than in the inner side tread 97, the outer sidewall 91 had low stiffness. Accordingly, the maximum cornering force was reduced under high load, and the rollover resistance was ensured under high load. Further, by providing higher hardness in the inner side tread 97 than in the outer side tread 96, stiffness was ensured in the inner sidewall 92. This allowed the tread surface 11 to receive a larger load during braking of the vehicle, thus improving the braking performance and the wear resistance as well. As a result, the rollover resistance was further improved, when improving the rollover resistance and the braking performance while maintaining the rollover resistance (Present Inventions 29 to 32, Present Inventions 34 and 35).

By arranging the outer side tread 96 to have JIS A hardness of 42 to 52, the stiffness of the outer sidewall 91 was reduced more reliably. Accordingly, the maximum cornering force was reduced under high load more reliably, and the rollover resistance was ensured under high load. On the other hand, by arranging the inner side tread 97 to have JIS A hardness of 53 to 65, the stiffness was ensured in the inner sidewall 92 more reliably, so that the braking performance was improved more reliably. By arranging the outer side tread 96 and the inner side tread 97 to have JIS A hardness falling in these ranges, appropriate stiffness was ensured in the sidewalls 15 located on the both sides in the tire width direction and designed to have different stiffness. This improved the stability when the vehicle traveled. As a result, while the rollover resistance was maintained more reliably, the braking performance was improved, and further, the handling stability was improved (Present Inventions 29 to 32).

As one of the seven performance evaluation tests, a seventh test method was conducted such that pneumatic tires 1 of size 185/60R15 were mounted on rims, then attached to a vehicle with an engine size of 1500 cc, and test run was performed. The evaluation method of this performance evaluation test was conducted by testing and evaluating rollover resistance as in the first test method, and handling stability as in the sixth test method. The evaluation of the handling stability is indicated as index values using handling stability of Comparative Example 9 (described later) as 100, and greater index values indicate more excellent handling stability.

In the seventh test method, a performance evaluation test was also conducted regarding hydroplaning. As the method for testing the hydroplaning, the vehicle with the pneumatic tires 1 for the performance evaluation test were driven in a water pool having a turning radius of 100R and a water depth of 10 millimeters, and the vehicle speed was gradually increased. The maximum vehicle speed is indicated as index values. The evaluation of the hydroplaning performance is indicated as index values using an evaluation result of hydroplaning obtained in Comparative Example 9 (described later) as 100, and greater index values indicate more excellent hydroplaning performance. At 97 or greater, the handling stability and the hydroplaning performance were evaluated as meeting the performance level of commercial use.

With the above method, these tests were performed on the test pneumatic tires 1 including nine types of the present invention, i.e., Present Inventions 36 to 44, and three types of comparative examples, i.e., Comparative Examples 9 to 11. In all of Present Inventions 36 to 44 and Comparative Examples 9 to 11, the tread surface 11 had an identical profile resistant to rollover.

In Comparative Example 9, no lug bottom up section was formed in the lugs. In Comparative Examples 10 and 11 and Present Inventions 36 to 44, lug bottom up sections were formed in the lugs such that in the lugs including the lug bottom up sections, the lug depth was less than the effective groove depth D1 of the main grooves. Further, in Comparative Examples 10 and 11, the lug depth of the lugs fell outside of the range of 50% to 70% of the effective groove depth D1, whereas in Present Inventions 36 to 44, the lug depth fell in the range of 50% to 70% of the effective groove depth D1. Further, in Present Inventions 36 to 44, JIS A hardness of the cap tread and the angle of the belt cords in the belt layers were different from one another.

The pneumatic tires 1 according to Comparative Examples 9 to 11 and Present Inventions 36 to 44 were tested and evaluated with the above method. Obtained results are shown in FIGS. 20A to 20D, in which FIG. 20A depicts results of the evaluation tests of Comparative Examples 9 to 11 and Present Invention 36, FIG. 20B depicts results of the evaluation tests of Present Inventions 37 to 40, FIG. 20C depicts results of the evaluation tests of Present Inventions 41 and 42, and FIG. 20D depicts results of the evaluations tests of Present Inventions 43 and 44.

As apparent from the test results shown in FIGS. 20A to 20D, by providing the lug bottom up sections in the lugs, and then by arranging the lugs including the lug bottom up sections to have the groove depth falling in the range of 50% to 70% of the effective groove depth D1, increase in maximum cornering force was prevented under high load, while the maximum cornering force was increased under low load. Further, water discharge was ensured through the lugs 115. Accordingly, the handling stability and the rollover resistance were improved without degrading the wet performance, which is hydroplaning performance (Present Inventions 36 to 44).

By arranging the cap tread to have JIS A hardness of 60 to 80, the cornering force was reduced under high load more reliably, and the handling stability was improved. Thus, the handling stability and the rollover resistance were improved more reliably without degrading the wet performance (Present Inventions 36 to 42). Further, by arranging the cap tread to have less JIS A hardness outside the low-load contact width than within the low-load contact width (Present Inventions 41 and 42), or by arranging the belt cords at a smaller angle with respect to the tire circumferential direction outside the low-load contact width than within the low-load contact width (Present Invention 42), the handling stability was improved more reliably.

INDUSTRIAL APPLICABILITY

As described above, a pneumatic tire according to the present invention is useful when its tread surface, seen in a meridional cross section, is formed of a plurality of arcs. The pneumatic tire is particularly appropriate when the tread surface is formed of three types of arcs.

The invention claimed is:

1. A pneumatic tire, comprising:
sidewalls on both tire-width-direction edges of the tire; and
a tread that is located radially outward of the sidewalls, includes a cap tread, and has a surface serving as a tread surface formed of a plurality of arcs of different curvature radii, as seen in a meridional cross section thereof, wherein
provided that the pneumatic tire is mounted on a normal rim and internal inflation pressure is 5% of normal internal pressure, and that the tread surface is formed of: a center arc located in a center portion in a tire width direction; a shoulder-side arc located at least on a vehicle-outer side in the tire width direction relative to the center arc; and a shoulder arc contouring a shoulder located on an edge of the tread surface, at least on the vehicle-outer side in the tire width direction,
F1, given by Formula (1) below expressing a relation between an outline range L1 and an extended tread width TDW, falls in a range of $0.64 \leqq F1 \leqq 0.7$,
F2, given by Formula (2) below expressing a ratio of a curvature radius TR1 of the center arc to a tire outside diameter OD, falls in a range of $1.2 \leqq F2 \leqq 2.0$,
F3, given by Formula (3) below expressing a ratio of a curvature radius TR2 of the shoulder-side arc to the curvature radius TR1 of the center arc, falls in a range of $0.1 \leqq F3 \leqq 0.2$, and
F4, given by Formula (4) below expressing a relation among an aspect ratio $\beta$, the extended tread width TDW, and a total width SW, falls in a range of $0.35 \leqq F4 \leqq 0.48$:

$$F1 = L1/(TDW \times 0.5) \tag{1}$$

$$F2 = TR1/OD \tag{2}$$

$$F3 = TR2/TR1 \tag{3}$$

$$F4 = (\beta \times TDW)/(100 \times SW) \tag{4}$$

where TR1 is the curvature radius of the center arc, TR2 is the curvature radius of the shoulder-side arc, L1 is the outline range of a width from an equatorial plane to a lateral edge of the center arc, TDW is the extended tread width being a lateral width of the tread surface, SW is the total width being a lateral width between laterally outermost portions of the sidewalls that are located on the both tire-width-direction edges and face each other, OD is the tire outside diameter being a largest diameter of the tread surface in a tire diameter direction, and $\beta$ is the aspect ratio,
wherein at least a portion of the cap tread is made of a compound having 300% tensile modulus of 5 MPa to 10 MPa.

2. The pneumatic tire according to claim 1, wherein a tangent line passing the lateral edge of the center arc and contacting the center arc and a tangent line passing a lateral outer edge of the shoulder arc and contacting the shoulder arc form an angle $\alpha$ falling in a range of $35° \leqq \alpha \leqq 60°$.

3. The pneumatic tire according to claim 1, wherein F5, found by Formula (5) below giving a ratio of a curvature radius SHR of the shoulder arc to the curvature radius TR1 of the center arc, falls in a range of $0.025 \leqq F5 \leqq 0.035$:

$$F5 = SHR/TR1 \tag{5}$$

where SHR is the curvature radius of the shoulder arc.

4. The pneumatic tire according to claim 1, wherein the tread is formed of at least the cap tread, and tread rubber including a base rubber layer located radially inward of the cap tread,
the base rubber layer has Japanese industrial standard (JIS) A hardness of 48 to 60 at room temperature, and
the base rubber layer has a cross-sectional area in a range of 20% to 50% of a cross-sectional area of the tread rubber seen in a meridional cross section.

5. The pneumatic tire according to claim 1, wherein beads including bead cores are provided radially inward of the sidewalls, and bead fillers are provided radially outward of the bead cores, and
G, given by Formula (6) below expressing a relation among the JIS A hardness Hs of the bead fillers, a filler height FH (millimeters), the tire outside diameter OD, and the aspect ratio $\beta$, falls in a range of $6 \leqq G \leqq 11$:

$$G = (Hs \times FH)/(OD \times \beta) \tag{6}$$

where Hs is JIS A hardness of the bead fillers, FH is the filler height that is a distance from an outer end, located on a radially outermost portion of one of the bead fillers seen in a meridional cross section, to a portion of the bead filler being farthest away from the outer end.

6. The pneumatic tire according to claim 1, wherein the extended tread width TDW includes an outer extended tire width TDWout being a width of a portion of the tread surface on the vehicle-outer side in the tire width direction relative to the equatorial plane, and an inner extended tire width TDWin being a width of a portion of the tread surface on a vehicle-inner side in the tire width direction relative to the equatorial plane, in which: the outer extended tire width TDWout is different from the inner extended tire width TDWin; the extended tread width TDW, the outer extended tire width TDWout, and the inner extended tire width TDWin have a relation expressed by TDW=TDWout+TDWin; and the outer extended tire width TDWout and the inner extended tire width TDWin has a relation expressed by $(TDWout \times 1.02) \leqq TDWin \leqq (TDWout \times 1.50)$,
the outline range L1 is an outer outline range L1out included in the outline range, and located on the vehicle-outer side in the tire width direction relative to the equatorial plane,
the curvature radius TR1 of the center arc is a curvature radius TR1out of an outer center arc included in the center arc, and located on the vehicle-outer side in the tire width direction relative to the equatorial plane,
the curvature radius TR2 of the shoulder-side arc is a curvature radius TR2out of an outer shoulder-side arc included in the shoulder-side arc and located on the vehicle-outer side in the tire width direction relative to the equatorial plane,
F1out, given by Formula (7) below expressing a relation between the outer outline range L1out and the outer extended tire width TDWout, falls in a range of $0.64 \leqq F1out \leqq 0.7$,
F2out, given by Formula (8) below expressing a ratio of the curvature radius TR1out of the outer center arc to the tire outside diameter OD, falls in a range of $1.2 \leqq F2out \leqq 2.0$,
F3out, given by Formula (9) below expressing a ratio of the curvature radius TR2out of the outer shoulder-side arc to the curvature radius TR1out of the outer center arc, falls in a range of $0.1 \leqq F3out \leqq 0.2$, and
F4out, given by Formula (10) below expressing a relation among the aspect ratio $\beta$, the outer extended tire width TDWout, and the total width SW, falls in a range of $0.35 \leqq F4out \leqq 0.48$:

$$F1out = L1out/TDWout \tag{7}$$

$$F2out = TR1out/OD \tag{8}$$

$$F3\text{out} = TR2\text{out}/TR1\text{out} \qquad (9)$$

$$F4\text{out} = (\beta \times TDW\text{out} \times 2)/(100 \times SW) \qquad (10).$$

7. The pneumatic tire according to claim 1, wherein provided that the laterally outermost portions of the sidewalls are tire maximum width positions, the sidewalls on the both tire-width-direction edges are arranged such that SDHout is greater than SDHin, in which SDHout is a length of a perpendicular line extending from one of the tire maximum width positions on an outer sidewall to a rotation axis, and SDHin is a length of a perpendicular line extending from the other tire maximum width position on an inner sidewall to the rotation axis, the outer sidewall and the inner sidewall both being the sidewalls and respectively located on the vehicle-outer side and on the vehicle-inner side in the tire width direction relative to the equatorial plane.

8. The pneumatic tire according to claim 7, wherein a difference S between SDHout and SDHin falls in a range of 4 millimeters≦S≦25 millimeters, in which SDHout is the length of the perpendicular line extending from the tire maximum width position on the outer sidewall to the rotation axis, and SDHin is the length of the perpendicular line extending from the tire maximum width position on the inner sidewall to the rotation axis.

9. The pneumatic tire according to claim 1, wherein
the sidewalls include side treads formed of a rubber material and located in laterally outermost portions thereof, and
the side treads of the sidewalls located on the both tire-width-direction edges include an outer side tread and an inner side tread, and the outer side tread has lower hardness than the inner side tread, the outer side tread and the inner side tread respectively included in the sidewalls located on the vehicle-outer side and on the vehicle-inner side in the tire width direction relative to the equatorial plane.

10. The pneumatic tire according to claim 9, wherein the outer side tread has JIS A hardness of 42 to 52, and the inner side tread has JIS A hardness of 53 to 65.

11. The pneumatic tire according to claim 9, wherein the side treads of the sidewalls are arranged such that a thickness of the outer side tread is less than a thickness of the inner side tread by 0.5 millimeter or more.

12. The pneumatic tire according to claim 1, further comprising:
beads including bead cores and provided radially inward of the sidewalls; and
a carcass provided between the beads on both sides in the tire width direction, spanned from one of the beads to the other bead, and having folded sections where the carcass is folded back outwardly in the tire width direction along the bead cores, wherein
the folded sections on the both sides in the tire width direction are arranged such that one of the folded sections located on the vehicle-outer side in the tire width direction relative to the equatorial plane has less height than the other folded section located on the vehicle-inner side in the tire width direction relative to the equatorial plane by 5 millimeters or more.

13. The pneumatic tire according to claim 1, wherein
the tread surface includes a plurality of main grooves extending in a tire circumferential direction, and a plurality of lugs extending in the tire width direction,
the main grooves include main-groove bottom up sections having a small groove depth,
the lugs include lug bottom up sections having a small groove depth,
the lug bottom up sections are formed such that, at a portion within a low-load contact width, the groove depth of the lugs is 50% to 70% of an effective groove depth that is the groove depth of the main grooves including the main-groove bottom up sections, the low-load contact width being a lateral contact width of the tread surface under low load, and
at a portion outer than the low-load contact width in the tire width direction, an outer inclined section is formed whose groove bottom is inclined such that the groove depth of the lugs is increased outwardly in the tire width direction from a low-load contact width edge being a lateral edge of the low-load contact width.

14. The pneumatic tire according to claim 13, wherein, provided that the main grooves include outermost main grooves located in laterally outermost portions, among the lugs, in each of the lug bottom up sections of the lugs connected to the outermost main grooves from inside in the tire width direction, an inner inclined section is formed that has same lateral width as the outer inclined section, and that has a groove bottom giving a groove depth outwardly increased in the tire width direction.

15. The pneumatic tire according to claim 13, wherein the cap tread is made of a compound having JIS A hardness of 60 to 80, and 100% tensile modulus of 1.5 MPa to 4.5 MPa.

16. The pneumatic tire according to claim 13, wherein the cap tread has greater JIS A hardness at a portion within the low-load contact width than at a portion located outer than the low-load contact width in the tire width direction by 5 to 20.

17. The pneumatic tire according to claim 13, further comprising a plurality of belt layers including belt cords and located radially inward of the tread, wherein
in the belt layers, an angle formed by the belt cords located within the low-load contact width with respect to the tire circumferential direction is smaller than an angle formed by the belt cords located outer than the low-load contact width in the tire width direction with respect to the tire circumferential direction by 3° to 10°.

\* \* \* \* \*